United States Patent
Campanella

(10) Patent No.: US 10,663,658 B2
(45) Date of Patent: May 26, 2020

(54) PHOTONIC RESONANT MOTOR

(71) Applicant: QOPSYS S.r.l., Gioia del Colle (Bari) (IT)

(72) Inventor: Carlo Edoardo Campanella, Gioia del Colle (IT)

(73) Assignee: QOPSYS S.r.l., Gioia del Colle (Bari) (IT)

( * ) Notice: Subject to any disclaimer, the term of this patent is extended or adjusted under 35 U.S.C. 154(b) by 0 days.

(21) Appl. No.: 16/348,699

(22) PCT Filed: Jun. 1, 2017

(86) PCT No.: PCT/IT2017/000111
§ 371 (c)(1),
(2) Date: May 9, 2019

(87) PCT Pub. No.: WO2018/087789
PCT Pub. Date: May 17, 2018

(65) Prior Publication Data
US 2019/0285797 A1    Sep. 19, 2019

Related U.S. Application Data

(60) Provisional application No. 62/420,450, filed on Nov. 10, 2016.

(51) Int. Cl.
*G02B 6/12*     (2006.01)
*G02B 6/293*    (2006.01)

(52) U.S. Cl.
CPC ..... *G02B 6/12007* (2013.01); *G02B 6/12002* (2013.01); *G02B 6/12004* (2013.01);
(Continued)

(58) Field of Classification Search
CPC ............ G02B 6/12007; G02B 6/12004; G02B 6/12002; G02B 6/29395; G02B 6/29343; G02B 6/29341
See application file for complete search history.

(56) References Cited

U.S. PATENT DOCUMENTS

| 7,583,874 B2 * | 9/2009 | Rakich ................... B82Y 20/00 |
| | | 359/346 |
| 9,069,004 B2 * | 6/2015 | Bhave ................... G01P 15/093 |
| 2009/0116788 A1 | 5/2009 | Rakich et al. |

FOREIGN PATENT DOCUMENTS

WO        2013052953 A1    4/2013

OTHER PUBLICATIONS

P. T. Rakich, M. A. Popović, M. Soljačić, and E. P. Ippen, Trapping, corralling and spectral bonding of optical resonances through optically induced potentials, Nature Photonics, Nov. 2007, pp. 658-665, vol. 1, No. 11, Nature Publishing Group.
(Continued)

*Primary Examiner* — Ryan A Lepisto
(74) *Attorney, Agent, or Firm* — Arent Fox LLP; Michael Fainberg

(57) ABSTRACT

Disclosed a photonic motor that comprises a first optical waveguides arrangement, including at least one first optical resonator lying in a first plane and forming a static part of the motor; at least a second optical waveguides arrangement, including at least one second optical resonator lying in a second plane parallel to the first plane and forming a moving part of the motor, wherein an evanescent-wave coupling of optical modes is established between at least one first optical resonator of the first optical waveguides arrangement and at least one second optical resonator of the second optical waveguides arrangement, the first and second optical resonator being adapted to guide at least one resonant symmetric mode at a predetermined first wavelength or at least one resonant anti-symmetric mode at a predetermined second wavelength or at least a combination or superposition of at least one resonant symmetric mode at a predetermined first wavelength.

27 Claims, 13 Drawing Sheets

(52) U.S. Cl.
CPC ...... *G02B 6/29341* (2013.01); *G02B 6/29343* (2013.01); *G02B 6/29395* (2013.01)

(56) References Cited

OTHER PUBLICATIONS

D. G. Rabus, Integrated Ring Resonators, The Compedium, Springer Series in Optical Sciences, 2007, vol. 127, Springer-Verlag.
M. L. Povinelli, Steven G. Johnson, Marko Lončar, Mihai Ibanescu, Elizabeth J. Smythe, Federico Capasso, and J. D. Joannopoulos, High-Q enhancement of attractive and repulsive optical forces between coupled whispering-gallery-mode resonators, Optic Express, 2005, pp. 8286-8295, vol. 13, Issue 20, OSA Publishing.
European Patent Office, International Search Report, issued in PCT/IT2017/000111, dated Oct. 12, 2017, Rijswijk, Netherlands.

* cited by examiner

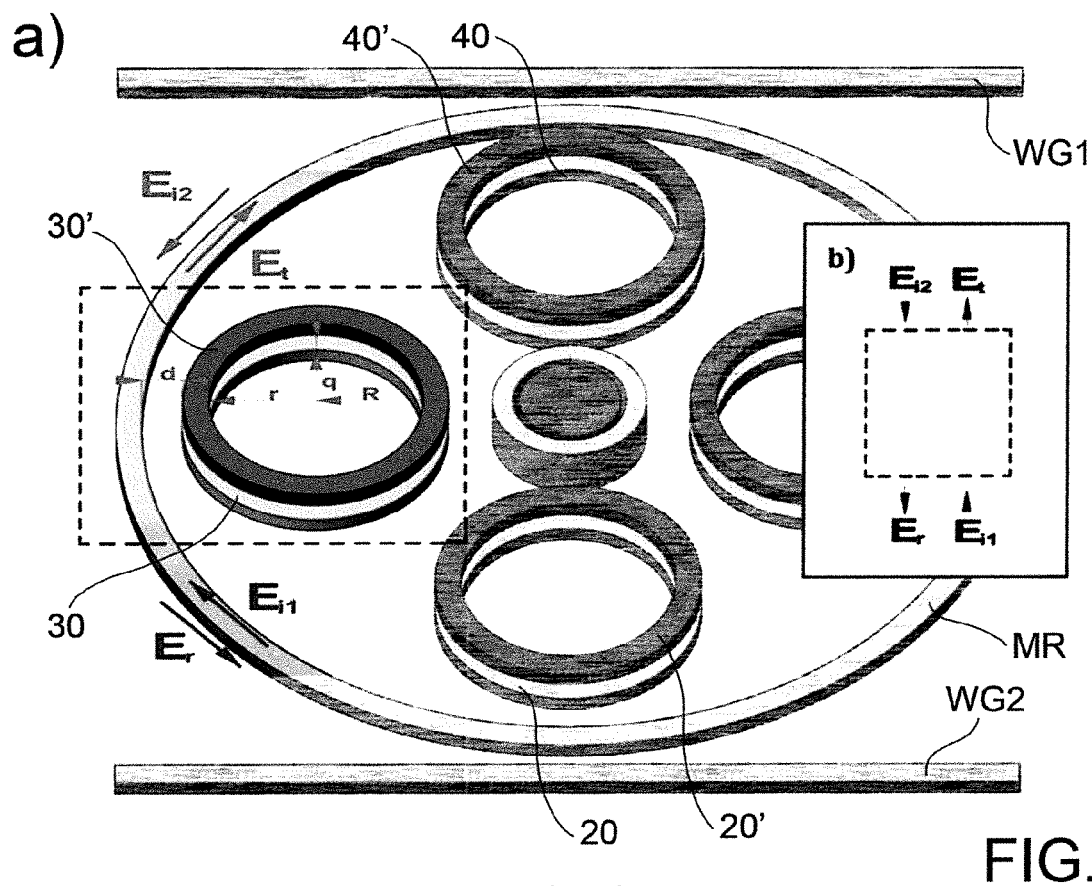
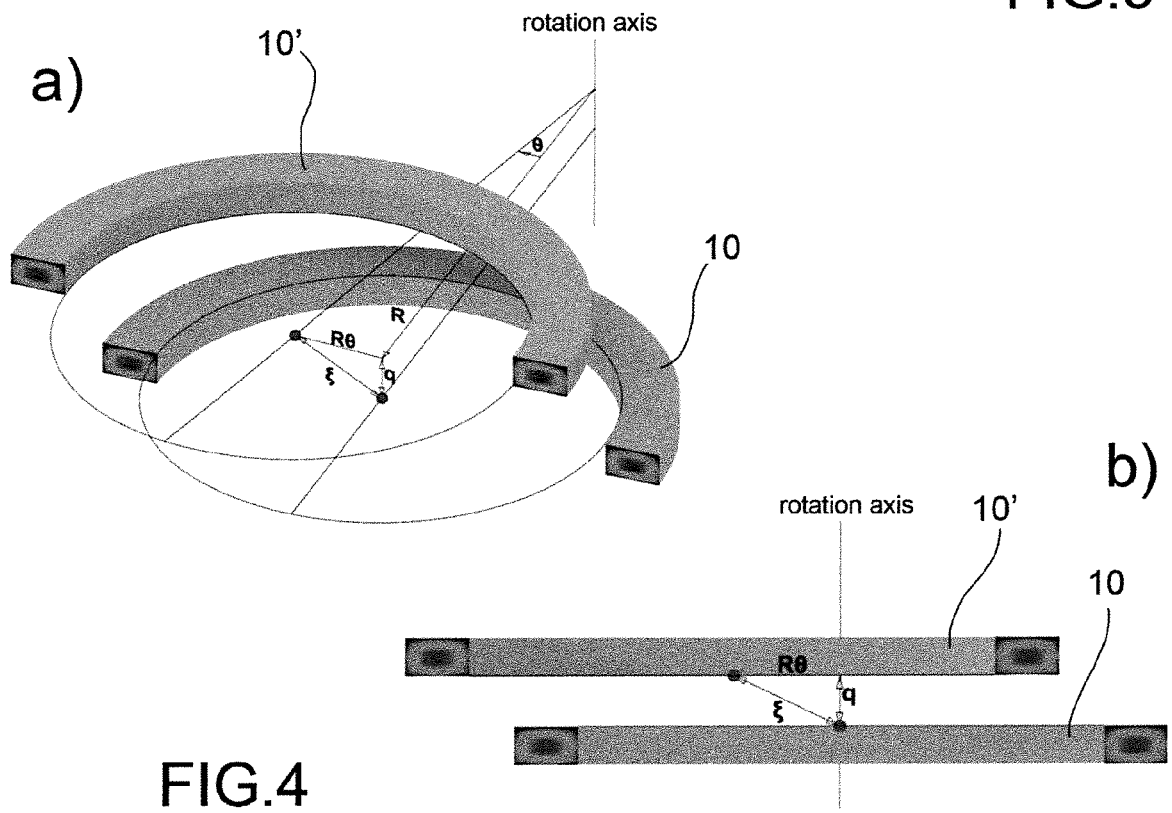
FIG. 3
FIG. 4

PHOTONIC RESONANT MOTOR

CROSS-REFERENCE TO RELATED APPLICATIONS

This application is a National Phase Application of PCT International Application No. PCT/IT2017/000111, International Filing Date, Jun. 1, 2017 which claims priority to U.S. Provisional Application No. 62/420,450 filed Nov. 10, 2016, each of which is hereby incorporated by reference in its entirety.

FIELD OF THE INVENTION

The present invention relates to opto-mechanical systems. Specifically, the present invention concerns an opto-mechanical device aimed at extracting mechanical energy from a photon source (i.e., a laser source). In particular, the present invention relates to a photonic motor exploiting opto-mechanical principles.

BACKGROUND OF THE INVENTION

Since 1821, Sir Michael Faraday adopted the magnetic force, generated by a current-carrying wire, to isolate and move continuously a magnetic pole in a coil. That was the first demonstration of an electric motor. In this kind of devices, the magnetic flux requires a continuous inversion to allow the rotation of the electrical motor.

Considering both micro and macro scale applications, so far current technologies in rotary motors domain are the following:

a) electrical motors and Micro-Electro-Mechanical-Motors (MEMS) based on the Faraday-Neumann-Lenz law, working on the interaction of magnetic fields and electric currents into conductor coils. The drawbacks regarding these devices are the construction limits in very small assemblies, restrained down to the millimetre scale, and the hazards rising from the use of high voltages and currents, always required in order to obtain useful torques;

b) reciprocating and rotating combustion engines, typically fed by non-renewable fuels, causing pollution of the environment and related troubles, dimensioned in the meter scale, and characterized by high operating temperatures and a number of hydraulic connections and moving mechanical components, thus reducing the reliability of the system;

c) Jet engines, e.g. gas turbines (such as in the form of Turboprop and Turboshaft) relying on Newton's 3rd Law of dynamics, and commonly based on Joule-Brayton thermodynamic cycle; they are typically known for the highest temperature reached during operation. Dimensions are comparable to the ones of the abovementioned engines, but the acoustic and environmental pollution troubles associated to them are much higher;

d) electromagnetic or chemical energy-driven molecular motors, able to perform rotary or linear motions;

e) Optical micro-motors, exploiting the radiation pressure deriving from the interaction between the light carried by an optical waveguide and a structure free to move.

At present, the most challenging limitations for existing motors are a low deliverable power in the case of micro motors, or the substantial weight, size, and polluting emissions in the case of macro motors.

Radiation pressure generates optical forces inducing mechanical displacements in opto-mechanical systems. Cavity opto-mechanics principles are, however, the most efficient strategy to enhance the strength of the optical forces acting on the matter, obtained through improving the light-matter interaction occurring in resonant photonic systems. To date, the investigation of cavity-enhanced opto-mechanical systems is limited to linear displacement systems allowing unidirectional actuation.

US 2009/0116788 discloses controlling optical resonances between two spaced-apart, coupled strong-confinement photonic devices, wherein optical resonances are used to generate optically induced forces and achieve precise mechanical actuation in an opto-mechanical system made of the two coupled strong-confinement photonic devices. Axial approach or departure between two stacked photonic devices formed as ring resonators are disclosed.

SUMMARY OF THE INVENTION

The object of the present invention is to provide an opto-mechanical system that efficiently converts optical power in a mechanical torque.

According to the present invention this object is achieved by a photonic motor having the features described and claimed herein.

Specifically, the invention relates to a photonic motor comprising:

at least one optical radiation input;

a first optical waveguides arrangement, including at least one first optical resonator arranged in a first plane to form a static part of said motor in a predetermined coordinate reference system of the motor;

an excitation optical waveguides arrangement coupled to said first optical waveguide arrangement at a predetermined optical mode coupling distance to said at least one first optical resonator and configured to receive at least one optical radiation of predetermined wavelength from said at least one optical radiation input and to optically couple said optical radiation to said at least one first optical resonator;

at least a second optical waveguides arrangement, including at least one second optical resonator arranged in a second plane parallel to said first plane at a predetermined stacking distance perpendicular to said planes, the second optical waveguides arrangement being configured to move in said second plane with respect to said first optical waveguide arrangement according to at least a predefined direction of movement so as to form a moving part of said motor in the predetermined coordinate reference system of the motor, wherein said predetermined stacking distance is adapted to establish an evanescent-wave mode coupling of optical modes between at least one first optical resonator of said first optical waveguides arrangement and at least one second optical resonator of said second optical waveguides arrangement in a proximity condition of said first and second optical resonator in a plane transversal to said first and second plane where local motion of said second arrangement occurs, said first and second optical resonator being adapted to guide at least one resonant symmetric mode at a predetermined first wavelength or at least one resonant anti-symmetric mode at a predetermined second wavelength or at least a combination or superposition of at least one resonant symmetric mode at a predetermined first wavelength and at least one resonant anti-symmetric mode at a predetermined second wavelength, as a function of said stacking distance as well as of the distance between said first and second optical resonator on the transversal plane, and wherein when a resonant symmetric mode is selectively established an attractive condition of the said second optical resonator towards said first optical resonator is established that generates on said second plane a motion of approach of the second optical resonator towards the first optical resonator according to said predefined local direction of movement, or when a resonant anti-symmetric mode is selectively established a repulsive condition of the said second optical resonator from said first optical resonator is established that generates on said second plane a motion of departure of the second optical resonator from the first optical resonator according to said predefined local direction of movement.

According to a second aspect, the photonic motor comprises control elements arranged to control at least a parameter of the radiation from said at least one optical radiation input so as to selectively establish at least one of said resonant symmetric and anti-symmetric mode.

According to a further aspect, said first optical waveguides arrangement includes a plurality of first optical resonators and said control elements are arranged to control at least a parameter of the optical radiation from said at least one optical radiation input to be received by said excitation optical waveguide arrangement so as to optically couple said optical radiation to each one of said plurality of first optical resonators in succession along said predefined direction of movement and to selectively establish at least one of said resonant symmetric and anti-symmetric mode between said each one of said plurality of first optical resonators or at least one second optical resonator in a proximity condition of said each one of said plurality of first optical resonators.

According to a further aspect, the parameter of the radiation from said optical radiation input is at least one of the wavelength, the phase, the polarization of said radiation, the turn on/off timing of said radiation, the power of said radiation.

According to a further aspect, said first optical waveguides arrangement includes a plurality of first optical resonators arranged along at least one predetermined path in the first plane and said second optical waveguides arrangement includes a plurality of second optical resonators arranged along at least one predetermined path in the second plane.

According to a further aspect, said control elements are arranged to control at least a parameter of the radiation from said at least one optical radiation input so as to selectively establish a resonant symmetric mode when the position of said at least one second optical resonator along said at least one predetermined path in the second plane lags behind the position of a coupled first optical resonator along said at least one predetermined path in the first plane according to said predefined direction of movement, and a resonant anti-symmetric mode when the position of said at least one second optical resonator along said at least one predetermined path in the second plane is ahead of the position of said coupled first optical resonator along said at least one predetermined path in the first plane according to said predefined direction of movement.

According to a further aspect, said at least one predetermined path in the first plane and said at least one predetermined path in the second plane are closed paths, and preferably they are circular paths.

According to a further aspect, a closed path of second optical resonators in said second optical waveguides arrangement is coaxial to a closed path of first optical resonators in said first optical waveguides arrangement.

According to a further aspect, said at least one predetermined path in the first plane and said at least one predetermined path in the second plane are rectilinear paths.

According to a further aspect, said optical resonators are evenly allocated along said predetermined paths.

According to a further aspect, said first and second optical resonators are ring resonators, preferably circular ring resonators, and said first optical resonators comprise a subset of selectively excited ring resonators and at least one excitation master ring resonator. Preferably, said subset of first ring resonators and said second ring resonators have the same diameter.

According to a further aspect, said first and second optical resonators are whispering-gallery mode optical resonators.

According to a further aspect, said predetermined stacking distance between the first plane and the second plane is based on at least one of said predetermined wavelength of the optical radiation from said optical radiation input, of the materials of said optical resonators, of geometrical features of said optical resonators.

According to a further aspect, said excitation optical waveguides arrangement comprise at least one excitation optical waveguide coplanar with said first optical waveguides arrangement. In a first embodiment or configuration, said first optical waveguides arrangement includes a plurality of first optical resonators arranged along at least one predetermined circular path in the first plane and said at least one excitation optical waveguide extends along a path at least partially sideways to said at least one circular path. In a further embodiment configuration, said first optical waveguides arrangement includes a plurality of first optical resonators arranged along a predetermined rectilinear path in the first plane and said at least one excitation optical waveguide extends along a path sideways to said rectilinear path.

According to a further aspect, said excitation optical waveguides arrangement comprise at least one excitation optical waveguide in a plane different from said first plane of the first optical waveguides arrangement.

According to a further aspect, said optical radiation input is at least one coherent radiation source or is coupled to at least one coherent radiation source. Preferably, said coherent radiation source is a laser source whose operating bandwidth is dependent upon at least the size and materials of said first and second optical resonators and the dielectric between said first and second optical waveguides arrangement.

According to a further aspect, at least a probe optical waveguide is coupled to said excitation optical waveguide arrangement.

According to a further aspect, each of said first and second optical resonators and said excitation optical waveguide arrangement are made as optical fibres, integrated optical guides on a dielectric substrate, semiconductor active or passive structures, plasmonic structures, polymeric structures.

According to a further aspect, the first optical waveguides arrangement is formed on a static part substrate arranged to be mechanically coupled to a first fixed machine structure at rest and the second optical waveguides arrangement is formed on a moving part substrate arranged to be mechanically coupled to a second machine structure movable with respect to said first fixed machine structure.

The invention further relates to a photonic motor assembly, including a plurality of elementary units each comprising a photonic motor as defined above, said elementary units being mechanically coupled on a plane or in a three-dimensional volume.

In summary, the present invention is based on radiation pressure generating optical forces inducing mechanical displacements in opto-mechanical systems. According to an aspect of the invention, an opto-mechanical system, where optical forces are generated through preferably circular arrangements of resonators, lying on two relatively moving, preferably rotating, planes, behaves like a photonic resonant motor. A photonic resonant motor is a cavity enhanced opto-mechanical rotating system conceived by means of coupled resonator dynamics and may advantageously be manufactured in a miniaturized silicon photonic system. Emerging semiconductor manufacturing technologies such as silicon photonics allow fabrication of opto-mechanical micro systems where the relative force strength is enhanced by the miniaturized dimensions.

An embodiment of the present invention includes a photonic resonant motor that utilizes photonic resonant structures to convert electromagnetic forces in order to generate useful mechanical energy. Such a photonic resonant motor can be actuated through an optically-induced force generated by tracking the wavelength of an optical signal (i.e., a laser source). Specifically, an arrangement of optically coupled optical resonators, rigidly connected to the same rotation axis according to an aspect of the invention, relatively revolves thanks to the generated asymmetric optical forces, induced by the resonance phenomena.

The photonic resonant motor is essentially a motor powered by a coherent radiation source (i.e., a laser beam) exciting a waveguides structure. It presents a port that allows the photons to enter into an electromagnetic waveguide that excites an arrangement of optical resonators located over two parallel closely situated surfaces in relative motion (i.e., sliding planes, rotating systems, etc.). While the fundamental building blocks can be manufactured in different shapes, the exemplary disclosed embodiment adopts a circular shape for both the resonant elements and the moving surfaces, and one of the surfaces in relative motion is fixed while the other one is free to rotate.

According to an aspect of the invention, a photonic motor may include one or more electromagnetic resonators. Specifically, the photonic motor may include one or more arrangements of optical resonators, optically coupled through two relatively-rotating planes. In this embodiment, the photonic motor should include at least two parallel planes in close proximity: a rotor plane, free to rotate, and a stator plane, at rest. According to an aspect of the invention, the stator plane comprises a number of optical closed paths, hereinafter named as 'ring resonators', that may be preferably arranged in a circular geometry and excited through one or more internal or external electromagnetic resonators (master electromagnetic resonators), such as a master ring resonator surrounding them. The master ring resonator may be excited through one or more bus waveguides. The rotor plane, similarly, contains the same number of optical ring resonators, whose number is related to the number of ring resonators placed on the stator plane, and preferably arranged in the same fashion as in the stator plane. The rotor and stator planes are optically coupled through an evanescent coupling, e.g. between mirrored ring resonators. The asymmetric optical forces, associated to the asymmetric resonant modes, enable the generation of opto-mechanical torque. It is possible to trap the momentum of the photons through a multi-resonator cavity-enhanced system and extract a useful opto-mechanical torque.

The rotor and the stator planes may be built with two semiconductor wafers, manufactured by using conventional micro-fabrication techniques widely adopted in the photonics technology industry. The optimal mechanical conditions allowing the relative rotation between rotor and stator can be obtained by adopting specific micro-mechanical solutions already available in the current technology landscape.

For opportunely chosen wavelengths of excitation, the photonic resonant motor passively rotates by tracking the wavelength of an optical source, under the torque generated through the coupling of the resonators on the stator and on the rotor planes, thereby generating an optical-induced torque. The asymmetric optical forces associated to the resonant symmetric and anti-symmetric modes exciting the rings contained in the photonic motor, enable the generation and exploitation of an opto-mechanical torque on the rotor.

Besides the wide range of practical applications, the photonic resonant motor demonstrates how it is physically possible to trap the momentum of photons, through an optical cavity-enhanced system, for extracting an opto-mechanical torque from the light-matter interaction.

The fundamental building blocks of the photonic resonant motor consists of vertically stacked, evanescently coupled, optical ring resonators, wherein the vertical inter-ring distance, the lateral distance between the master ring and the stator rings, the lateral distance between the master ring and the bus waveguide determine the distribution of the optical power in each ring that consequently regulates the spectral features of the photonic resonant motor. In a preferred embodiment, the photonic resonant motor includes a closed loop of N couples of vertically stacked ring resonators (CVSRRs), evenly interleaved through a periodical circular distribution of period $2\pi/N$.

In a preferred embodiment, N=4 and the four CVSRRs interact with each other through the closed loop consisting in an another ring, lying in the stator plane (coinciding with the plane where the bottom rings of the four CVSRRs are located) and called 'master ring resonator'. The radius of the master ring is opportunely chosen so that the lateral cross-coupling between the couples of VSRR is avoided. The master ring is excited through a bus waveguide (or an array of waveguides) located in the stator plane. Although two different optical modes (Quasi-TE and Quasi-TM) can be supported by the waveguides, only the fundamental mode (Quasi-TE) is selectively excited in a number of ways, for instance by adjusting the polarization of the laser source.

Such a photonic motor can be optically modeled by the transfer matrix method, the scattering matrix method, and the coupled mode theory (CMT). By using a lumped parameters model, the opto-mechanical force (radiation pressure), regulating the mechanical behaviour of the photonic motor, is derived by the quantum theory.

The force F between two weakly-coupled resonators can be derived from the resonant wavelength shift ($\Delta\lambda$) resulting from a rotation θ about the axis perpendicular to the plane where the resonators are situated. The force F is given by:

$$F = \frac{1}{2\pi c} \frac{d(\Delta\lambda(\theta))}{d\xi(\theta)} P Q_m$$

where ξ is the distance between a ring on the stator and a rotor ring, corresponding to an angle of θ. $Q_m$ is the quality factor of a single rotor/stator ring (associated to the m-th order of resonance), while P is the optical power circulating in the VSRRs.

P is given by $P_i E_N$ where $P_i$ is the input laser power and $E_N$ is the power enhancement factor due to the presence of the master resonator, which allows the recirculation of the photons in the VSRRs.

The resonant electromagnetic energy stored in a ring resonator of the stator is $PQ\lambda_m/2\pi c$ ($\lambda_m = 2\pi r/n_{eff}$, with r the stator/rotor ring radius and $n_{eff}$ the effective refractive index of a stand-alone stator/rotor ring waveguide cross-section). $Q_m$ can be evaluated in a single ring resonator of the stator/rotor, without the perturbation related to the presence of the other rotor/stator ring and calculated at a rotation angle of $\theta = \pi p/N$ (p is an integer and N is the overall number of VSRRs pairs).

Further features and advantages of the present invention will be disclosed in more detail in the following description of preferred embodiments, given by way of non-limitative examples, with reference to the drawings.

BRIEF DESCRIPTION OF THE DRAWINGS

FIGS. 3*a* and 3*b* show a basic element of the photonic motor consisting of a pair of VSRRs and a lumped parameter block associated with the transfer matrix for a pair of VSRRs, respectively, in the embodiment of photonic motor of FIG. 1*b*;

FIGS. 4*a* and 4*b* show a single pair of VSRRs where a rotor ring is free to rotate with an angle $\theta$ (around the rotation axis) with respect to the stator ring, respectively in a 3D view and in a cross section view;

DETAILED DESCRIPTION

Figure 1:
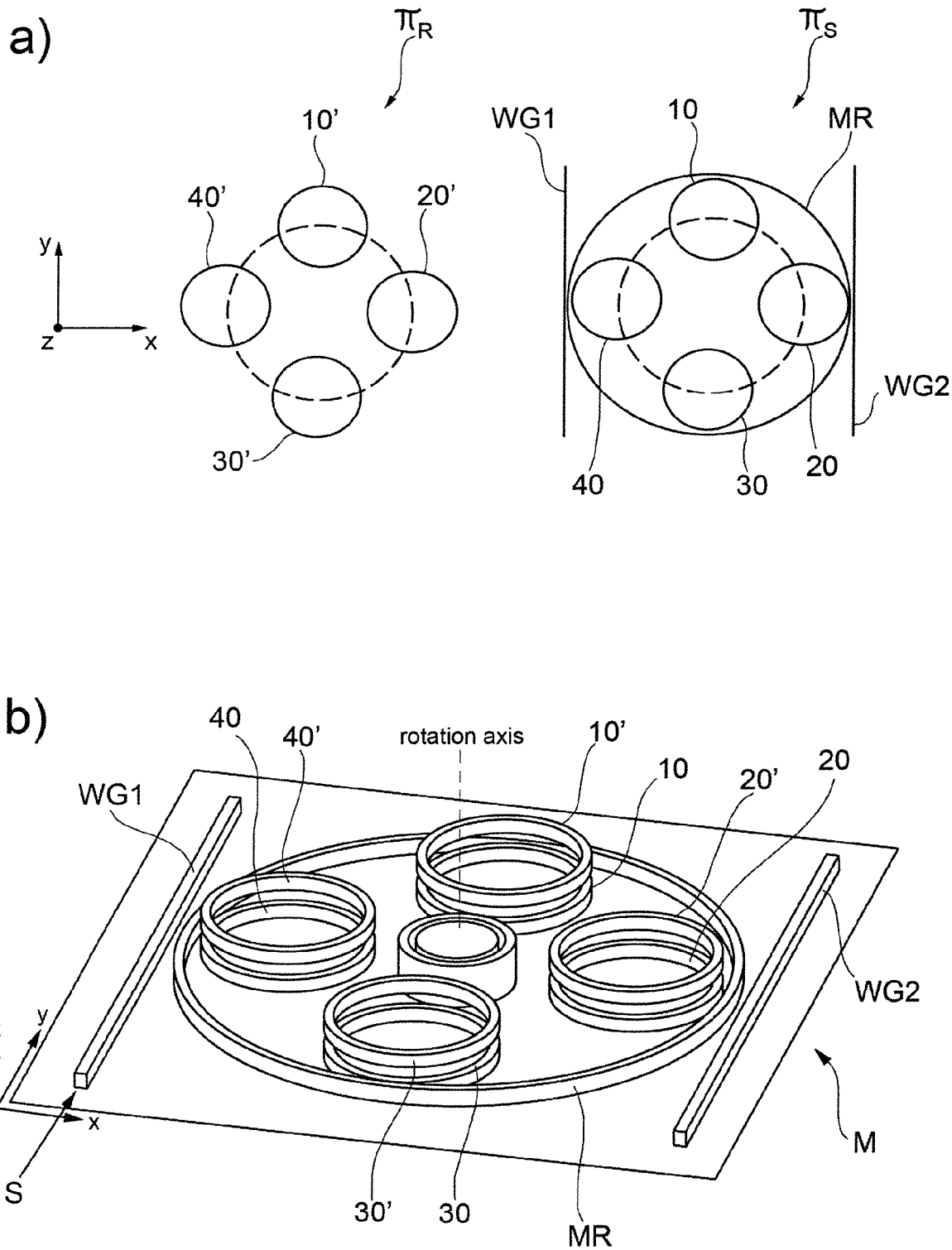
FIGS. 1*a* and 1*b* are a schematic top view of the rotor and stator plane in an embodiment of the photonic resonant motor according to the invention, and a prospective view of said photonic motor including rotor and stator plane, respectively.

In the following an exemplary photonic resonant motor M is disclosed that comprises an arrangement of two sets of wave-guiding photonic resonators, optically coupled one to the other and having the same rotation axis, relatively revolving thanks to the generated asymmetric optical forces that are induced by the resonance phenomena.

The opto-mechanical system of the photonic resonant motor M according to an embodiment of the present invention comprises two parallel planes lying in close proximity: a rotor plane $\Pi_R$ free to rotate, and a stator plane $\Pi_S$, at rest, depicted in FIGS. 1*a* and 1*b*.

The photonic motor M comprises:
- at least one optical radiation input S;
- a first optical waveguides arrangement, including at least one and preferably a plurality of first optical resonators 10, 20, 30, 40 and a master ring resonator MR arranged in the stator plane to form a static part of said motor in a predetermined coordinate reference system x, y, z of the motor;
- an excitation optical waveguides arrangement, preferably including at least one excitation optical bus waveguide WG1, and in the depicted embodiment including a pair of excitation optical bus waveguides WG1 and WG2, coupled to said first optical waveguides arrangement at a predetermined optical mode coupling distance to the master ring resonator MR or more generally to at least one first optical resonator, and configured to receive at least one optical radiation of predetermined wavelength from the optical radiation input S and to optically couple said optical radiation to said at least one first optical resonator;
- at least a second optical waveguides arrangement, including at least one and preferably a plurality of second optical resonators 10', 20', 30', 40' arranged in the rotor plane, parallel to the stator plane at a predetermined stacking distance perpendicular to said planes.

The second optical waveguides arrangement is configured to move in the rotor plane with respect to said first optical waveguides arrangement according to at least a predefined direction of movement so as to form a moving part of motor M in the predetermined coordinate reference system x, y, z of the motor.

In the exemplary embodiment of the invention depicted in FIGS. 1*a* and 1*b* the stator plane contains a number of optical ring resonators 10, 20, 30, 40 arranged in a circular geometry and simultaneously excited through the master ring resonator MR surrounding them. The rotor plane, similarly, contains preferably the same number of optical ring resonators 10', 20', 30', 40' arranged in the same fashion as in the stator plane. The rotor and stator planes are optically coupled through an evanescent coupling between mirrored ring resonators.

For certain input wavelengths of excitation, the photonic resonant motor rotates by tracking the wavelength of an optical source, thanks to the opto-mechanical torque generated through the radiation pressure force deriving from the coupling of the stator resonators with the rotor ones. The asymmetric optical forces associated to the resonant symmetric and anti-symmetric modes exciting the rings create useful torque on the rotor. An embodiment of the photonic resonant motor is shown in FIG. 1a, where a top view of the rotor and stator plane is sketched, and in FIG. 1b where a 3D view of the photonic resonant motor is reported.

Differently, FIGS. 2a-c show the cross sections of the stator plane and rotor plane when they are bonded via a mechanical joint made of silicon dioxide (supposed to be a built-in pin on the rotor and a corresponding recessed seat on the stator, shown in an exploded view in FIG. 2a), when the rotor is at rest (shown in FIG. 2b), and for small rotations (θ) of the rotor with respect to the condition at rest (shown in FIG. 2c).

An example of implementation of a photonic resonant motor based on the interaction of optical resonators is described in the following.

The basic element (fundamental cell) of the photonic resonant motor according to an embodiment of the invention includes two vertically stacked wave-guiding ring resonators, evanescently coupled each other. The vertical inter-ring distance is indicated q, the lateral stator ring-master ring distance is indicated d, while the lateral master ring—bus waveguide distance is indicated g. By using the Finite Element Method (FEM), an association between the physical parameters q, d, and g and the fractions of the optical powers that regulate the spectral features of the photonic resonant motor may be found.

The whole optical resonant cavity is composed by a closed loop of N pairs of vertically stacked ring resonators (CVSRRs) of internal radius r, equally interspaced through a periodical circular distribution of period $2\pi/N$ rad. According to the disclosed exemplary embodiment N=4 and, thus, the four CVSRRs interact each other only through the closed loop consisting of a wider ring lying in the stator plane (i.e., coinciding with the plane where the bottom rings of the four CVSRRs are located) called 'master ring', whose radius $R_{MR}$ is chosen, together with q, in order to avoid the lateral cross-coupling between the master ring and the rotor rings.

The master ring is excited through one or two bus waveguides, WG1 and WG2, lying in the stator plane.

The photonic motor can be optically modeled by the transfer matrix method, the scattering matrix method and the coupled mode theory (CMT) as described in the following, by analyzing its basic element, consisting in of two vertically stacked ring resonators, i.e. the top ring belonging to the rotor plane and the bottom one belonging to the stator plane, as depicted in FIG. 3a.

The optical feature of a single pair of VSRRs can be derived by Coupled Mode Theory (CMT) and, then, used to construct the transfer matrix associated to this pair (block).

By denoting with ζ the curvilinear coordinate along the two VSRRs, depending from axis x, y in the stator and rotor plane, the amplitudes of the optical signal propagating in the bottom and in the top rings are $a_1(\zeta)$ and $a_2(\zeta)$, respectively. The dependence of these two amplitudes on the curvilinear coordinate ζ can be modelled by CMT, which provides these two coupled differential equations:

$$\frac{1}{d\zeta}\begin{bmatrix} a_1 \\ a_2 \end{bmatrix} = \tag{1}$$

-continued
$$\frac{j\omega}{c}\begin{bmatrix} n_g & [n_{Sym}(q,\theta)-n_{Asym}(q,\theta)]/2 \\ [n_{Sym}(q,\theta)-n_{Asym}(q,\theta)]/2 & n_g \end{bmatrix}\begin{bmatrix} a_1 \\ a_2 \end{bmatrix} =$$
$$j\begin{bmatrix} \beta & k(q,\theta) \\ k(q,\theta) & \beta \end{bmatrix}\begin{bmatrix} a_1 \\ a_2 \end{bmatrix}$$

where j is the imaginary unit, ω is the angular frequency (i.e., $2\pi c/\lambda$ with c the speed of the light in vacuum and λ the wavelength), $n_{Sym}$ and $n_{Asym}$ are the effective indices associated to the symmetric and anti-symmetric modes, respectively, while $n_g$ is the group index of a standing alone (unperturbed) waveguide. $n_{Sym}$ and $n_{Asym}$ can be evaluated by FEM by considering the e.m. distribution of the optical field in the cross section of two coupled waveguides, while $n_g$ results from the e.m. analysis of the cross section of the unperturbed standing alone waveguide. It is important to notice that $n_{Sym}$ and $n_{Asym}$ are function of the distance ξ between the cross sections of the two coupled optical waveguides, that can be evaluated through considering the distance between the centres of the two VSRRs as shown in FIG. 4.

This distance ξ depends on the vertical distance q between the two VSRRs and on the rotation angle θ once fixed the distance R between the rotation axis and the ring centres. In other words, with reference to the structure depicted in FIG. 1, by isolating a single pair of VSRRs in FIG. 4, a rotor ring is able to rotate of an angle θ thus affecting the e.m. field distribution and, in turn, $n_{Sym}$ and $n_{Asym}$. So, the rotatory dynamics of the system is considered through the rotatory dependence of $n_{Sym}$ and $n_{Asym}$ in Eqn. (1). In the third member of Eqn. (1), β is the propagation constant of the unperturbed waveguide (i.e., $\beta=2\pi n_{eff}/\lambda=\omega_{eff}/c$), k is the propagation constant, function of q and θ, associated to the combination of $n_{Sym}$ and $n_{Asym}$.

By neglecting the propagation losses, the two general solutions $a_1(\zeta)$ and $a_2(\zeta)$, of the system described by Eqn. (1), are:

$$\begin{bmatrix} a_1(\zeta) \\ a_2(\zeta) \end{bmatrix} = \begin{bmatrix} \cos(k(q,\theta)\zeta)\exp(j\beta\zeta - \frac{\alpha}{2}\zeta) & j\sin(k(q,\theta)\zeta)\exp(j\beta\zeta - \frac{\alpha}{2}\zeta) \\ j\sin(k(q,\theta)\zeta)\exp(j\beta\zeta - \frac{\alpha}{2}\zeta) & \cos(k(q,\theta)\zeta)\exp(j\beta\zeta - \frac{\alpha}{2}\zeta) \end{bmatrix} \tag{2}$$
$$\begin{bmatrix} a_1(0) \\ a_2(0) \end{bmatrix}$$

The two amplitudes $a_1(\zeta)$ and $a_2(\zeta)$ can be determined by imposing boundary conditions. The first boundary condition is:

$$a_1(L)=a_2(0) \tag{3}$$

Eqn. (3) is a closure condition due to the circular shape and due to the condition that the upper ring is only coupled with the lower ring and not with the master ring. L is the average perimeter of each ring of the pair of VSRRs (i.e., $L=2\pi r$).

By supposing the presence of a single excitation source (i.e., $E_{i1}$ in FIG. 3b)), the coupling between the master ring and one of the lower rings is modelled by the following transfer matrix:

$$\begin{bmatrix} E_t \\ a_1(0) \end{bmatrix} = \begin{bmatrix} \tau & jh \\ jh & \tau \end{bmatrix}\begin{bmatrix} E_{i1} \\ a_1(L) \end{bmatrix} \tag{4}$$

where $E_{i1}$ is the amplitude of the signal on the master ring before interacting with a pair of VSRRs, and $E_t$ is the amplitude of the signal in the master ring after the interaction with a pair of VSRRs (See FIG. 3a). The second equation of the system of Eqns. (4) rules the second boundary condition as:

$$a_1(L) = \frac{a_1(0) - jhE_{i1}}{\tau} \quad (5)$$

By imposing the two boundary conditions (Eqns. (3) and (5)) to the equation system in Eqns. (2), we obtain:

$$a_1(L) = -\frac{jhe^{j\beta L}[e^{j\beta L} - \cos(k(q,\theta)L)]}{1 + \tau e^{2j\beta L} - (1-\tau)e^{j\beta L}\cos(k(q,\theta)L)} E_{i1} \quad (6)$$

Once fixed an order of resonance m, the resonance conditions (obtained by imposing the denominator of Eqn. (6) equal to zero) occur for $\omega \approx \omega^m_\pm$, where $\omega^m_+$ is the symmetric resonance frequency and $\omega^m_-$ is the anti-symmetric one. These resonances are combinations of the difference between $n_{Sym}$ and $n_{Asym}$ and their expressions are given by:

$$\omega^m_\pm \approx \omega_m \mp \frac{\omega_m}{2}\left(\frac{n_{Sym}(q,\theta) - n_{Asym}(q,\theta)}{n_g}\right) = \omega_m \mp \frac{\omega_m}{n_g}k(q,\theta) \xrightarrow{\frac{\Delta\omega}{\omega} = -\frac{\Delta\lambda}{\lambda}} \lambda^m_\pm \approx \lambda_m \pm \frac{\lambda_m}{n_g}k(q,\theta) \quad (7)$$

where $\omega^m$ is the resonance frequency ($\lambda_m$ is the resonance wavelength) of a single ring resonator (on the stator plane) occurring when the distance between the two VSRRs is large enough to avoid the interaction between them.

$\omega^m (\lambda_m)$ is given by:

$$\omega_m = \frac{2cm\pi}{Ln_{eff}} \rightarrow \lambda_m = \frac{Ln_{eff}}{m} \quad (8)$$

The resonance condition corresponds to the condition for which $\omega L/c = 2\pi m$, with m corresponding to the resonance order. By combining Eqns. (4) and (6), we derive the optical field amplitude transmitted on the master ring through a pair of VSRRs as:

$$t(\lambda, q, \theta) = \frac{E_t}{E_{in}} = \tau + \frac{h^2 e^{j\beta(\lambda)L}[e^{j\beta(\lambda)L} - \cos[k(q,\theta)L]]}{1 + \tau e^{2j\beta(\lambda)L} - (1-\tau)e^{j\beta(\lambda)L}\cos[k(q,\theta)L]} \quad (9)$$

The model has been validated through three-dimensional Finite Difference Time Domain (3D-FDTD) method.

The optical wave-guiding structures, forming the ring resonators and the two bus waveguides of the photonic resonant motor, are preferably silicon wires (silicon refractive index $n_{Si}$=3.45) characterized by a cross section of width W=500 nm and height H=300 nm. The rotor silicon ring resonators and the stator ones are anchored to two silicon dioxide disks (refractive index $n_{SiO2}$=1.46), belonging to two different silicon substrates. The two different rotor and stator planes are bonded via a mechanical joint made of silicon dioxide (supposed to be a built-in pin on the rotor and a corresponding recessed seat on the stator) and surrounded by air ($n_{air}$=1).

The wave-guiding components are preferably realized with silicon photonics technology, allowing extreme miniaturization of the integrated optics devices and, thus, an improvement of opto-mechanical effects due to the strong light-matter interaction that can be used as fundamental strategy for the best performance of the photonic resonant motor.

In the particular case of a pair of vertically stacked ring resonators, it is considered the eigenvalues grid, obtained by finding the resonance wavelengths that zero the denominator of Eqn. (9). In FIG. 5a the mode-splitting dynamics when θ=0 [rad] and q, the vertical distance, is a free parameter (i.e., the two VSRRs are free to move in the axial direction) is depicted. For simplicity, we can rename k(q,0) as k(q), and the asymmetric resonances, associated with the mode-splitting, result to be ruled by:

$$\lambda^m_\pm(q) \approx \lambda_m \pm \frac{\lambda_m}{n_g}k(q) \quad (10)$$

By fixing q=q* (i.e., by fixing the distance associated to the vertical coupling in order to operate in a condition below to the 'trapping' condition, as disclosed in P. T. Rakich, M. A. Popović, M. Soljačić, and E. P. Ippen, "Trapping, corralling and spectral bonding of optical resonances through optically induced potentials," Nat. Photonics 1(11), 658-665 (2007), corresponding to the crossing of two asymmetric resonances of two contiguous resonant orders) and by considering the rotor ring free to rotate of an angle θ with respect to the stator ring, the mode-splitting dynamics of the rotating structure can be evaluated through $$k(q^*,\theta) = [n_{Sym}(q^*,\theta) - n_{Asym}(q^*,\theta)]/2$$

Intuitively, with reference to the embodiment of the photonic motor in FIG. 1, characterized by 4 pairs of VSRRs distributed in a circular arrangement, the same mode-splitting condition that occurs for θ=0 in a single pair of VSRRs, will occur for θ=2πp/N (p is an integer and N is the overall number of pairs of VSRRs as depicted in FIG. 5b).

At the angular conditions θ=(2p+1)π/N the rotor ring resonator is fully decoupled from the all stator ring resonators and no e.m. energy is exchanged between rotor and stator ring resonators. In the transmission spectrum, this condition is visible as the disappearing of the mode-splitting since the two resonance lines coincide with the resonance line of the standing alone stator ring resonator ($\lambda^m_\pm \approx \lambda_m$). Additionally, due to the continuity of the eigenvalues and to the rotatory symmetry, i.e. $\lambda^m_\pm(\theta^*) = \lambda^m_\pm(-\theta^*)$, the mode-splitting dynamics is characterized by minima displaced at $\lambda^m_\pm \approx \lambda_m$ for angles θ=(2p+1)π/N, and maxima displaced at:

$$\lambda^m_\pm \approx \lambda_m \pm \frac{\lambda_m}{n_g}k(q^*) \quad (11)$$

for angles θ=2πp/N. In particular, the rotatory mode-splitting dynamics is ruled by:

$$\lambda^m_\pm(\theta) \approx \lambda_m \pm \frac{\lambda_m}{n_g}[n_{Sym}(q^*,\theta) - n_{Asym}(q^*,\theta)]/2 \quad (12)$$

Figure 5:
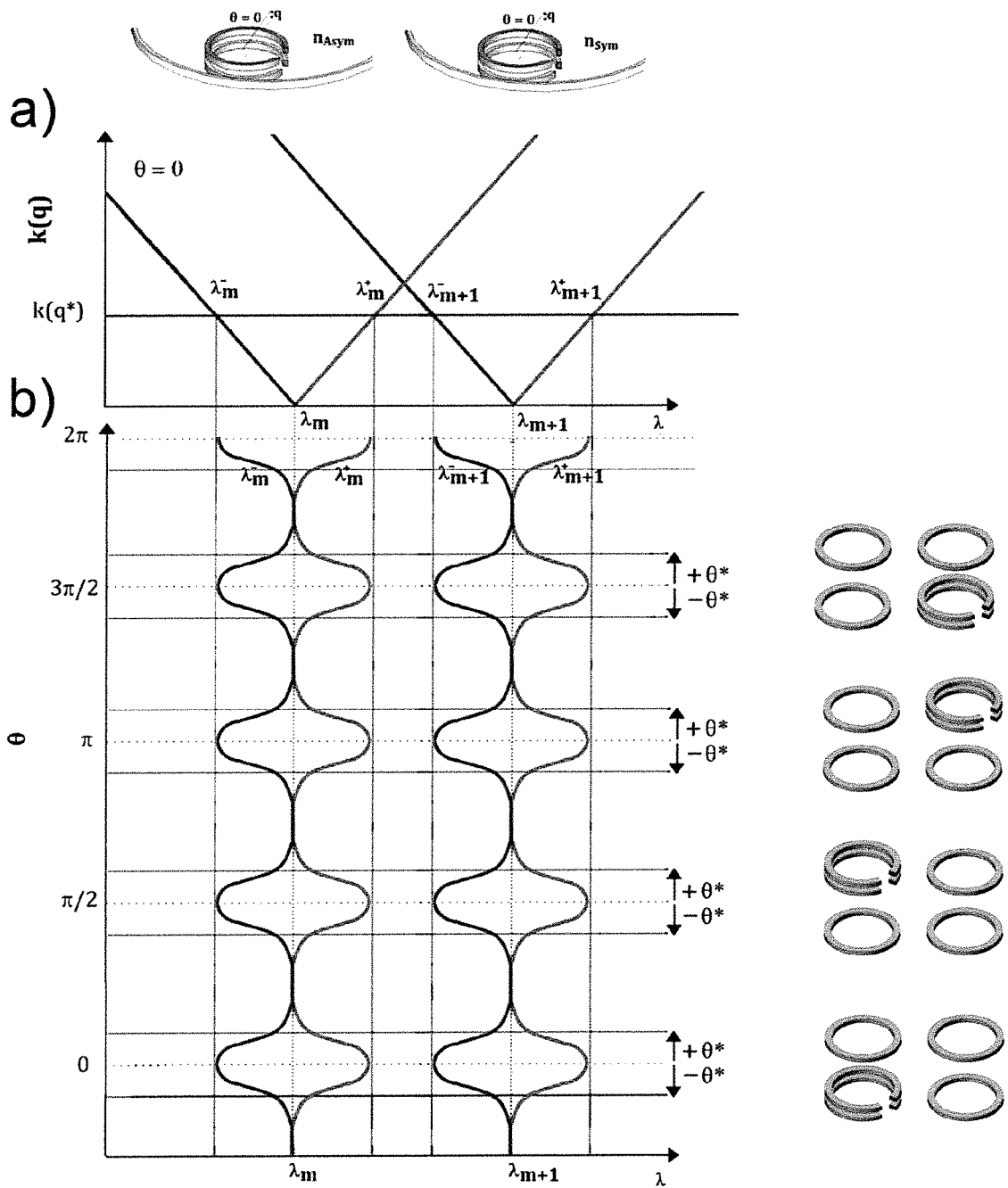
FIGS. 5*a* and 5*b* show the mode splitting dynamics for a single pair of VSRRs, respectively as a function of inter-rings distance and as a function of the inter-ring rotation angle.

The conditions expressed through Eqns. (10)-(12) are graphically represented in FIG. 5 where the mode splitting dynamics is reported with reference to a single pair of VSRRs. In FIG. 5a the inter-rings distance q is variable, while the rotation angle θ is null; differently, in FIG. 5b the inter-ring rotation angle θ is varied from 0 to 2π while q is fixed to q*.

Figure 6:
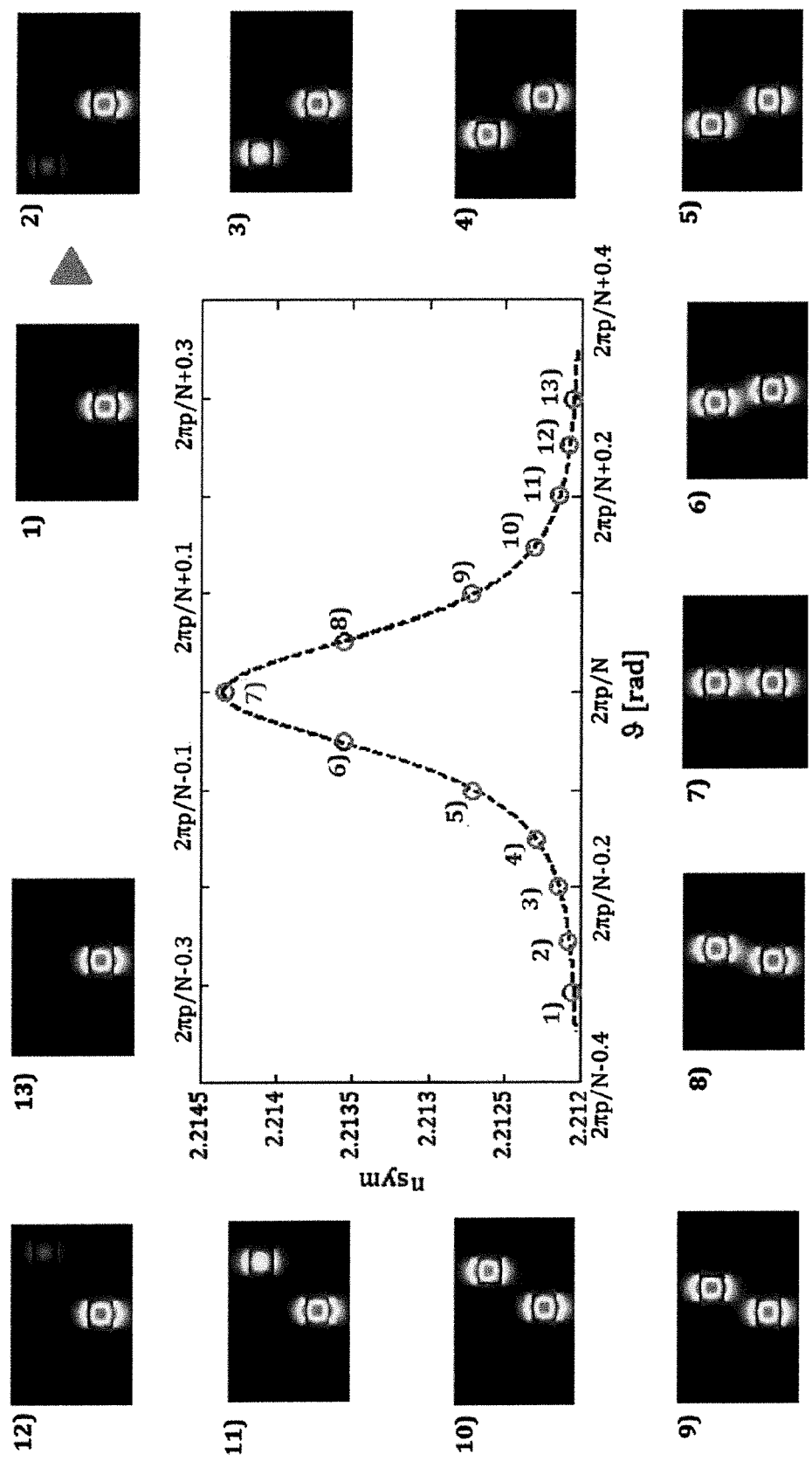
FIG. 6 shows the evolution of the effective refractive index of a symmetric mode as a function of the rotation angle between stator plane and rotor plane as well as, in the insets, the symmetric mode electromagnetic field distributions at the indicated rotation positions along the effective refractive index curve.

On the basis of the previous considerations, it is fixed q=q*=400 nm and it is considered a rotation radius R−r−W/2≈5 μm, valid for those waveguide cross sections closer to the rotation axis. With these parameters, through the Finite Element Method, we simulate the rotary dynamics of $n_{Sym}$ in FIG. 6 and $n_{Asym}$ in FIG. 7 for small angles θ around the conditions θ=2πp/N, in the angular range [2πp/N−0.4, 2πp/N+0.4]. Obviously, although these reported rotatory dynamics are related to the waveguides cross sections that are closest to the rotation axis of the optical motor (i.e., R−r−W/2≈5 μm), the results obtained show the same trend for waveguides cross sections having larger rotation radii. Therefore, by imposing a clockwise rotation, $n_{Sym}(\theta)$ shows a quasi-lorentzian distribution, as depicted in FIG. 6.

Indeed, the numerical FEM data have been successfully interpolated with the following function:

$$n_{Sym}(\theta) \approx n_g + \frac{1}{2\pi} \frac{a}{\left(\theta^2 + \left(\frac{1}{2}a\right)^2\right)^y} \quad (13)$$

where a=12 and y=1.87.

By moving from inset 1) to inset 13), the distributions of the e.m. field associated to the rotation of the rotor waveguides cross-section have also been reported in FIG. 6.

Figure 7:
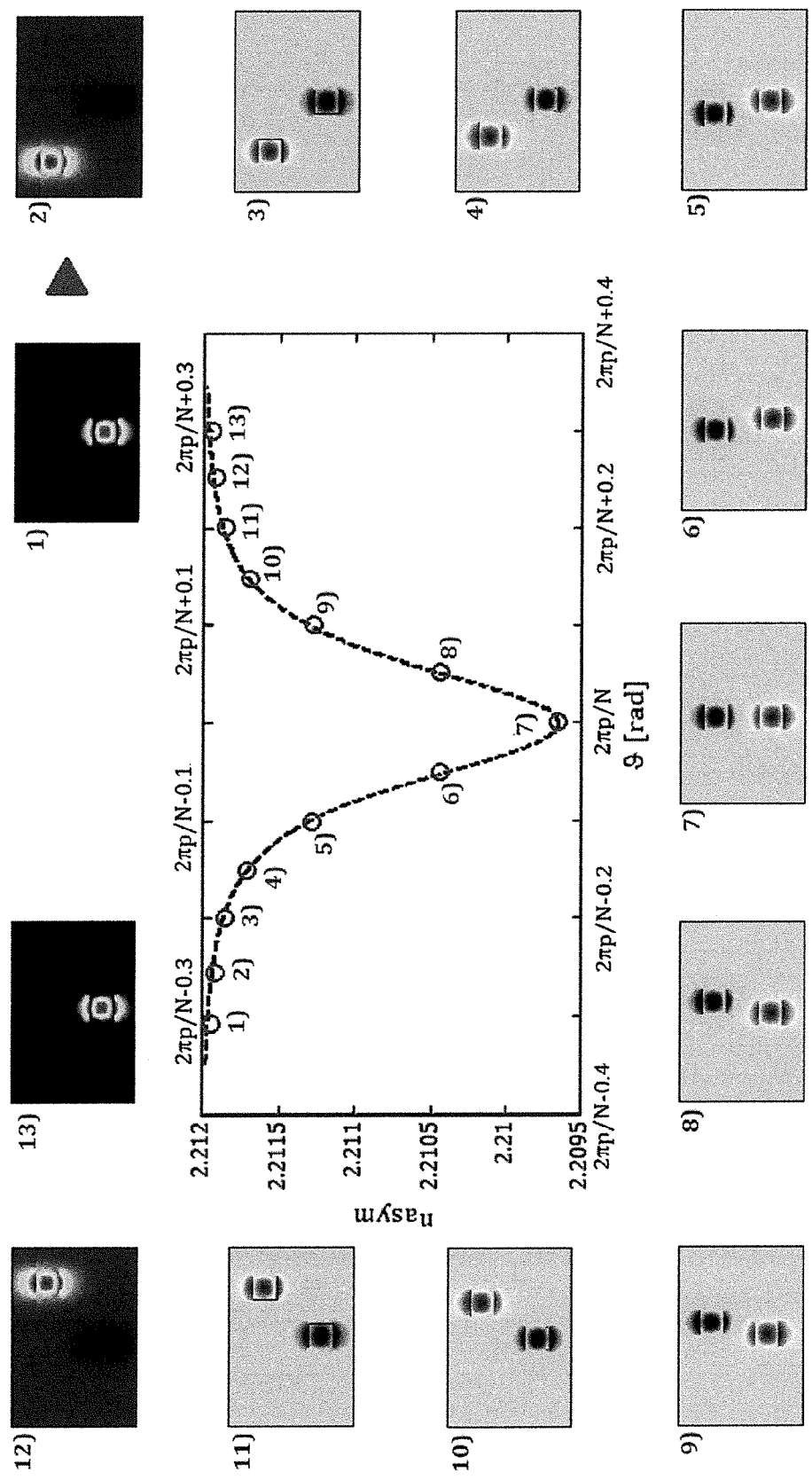
FIG. 7 shows the evolution of the effective refractive index of an anti-symmetric mode as a function of the rotation angle between stator plane and rotor plane as well as, in the insets, the anti-symmetric mode e.m. field distributions at the indicated rotation positions along the effective refractive index curve.

Following the same evaluation condition of $n_{Sym}(\theta)$, it is shown $n_{Asym}(\theta)$ in FIG. 7.

For the sake of simplicity, the interpolation of $n_{Asym}(\theta)$ has been performed with a quasi-lorentzian function holding the same parameters of the previous Eqn. (13):

$$n_{Asym}(\theta) \approx n_g + \frac{1}{2\pi} \frac{a}{\left(\theta^2 + \left(\frac{1}{2}a\right)^2\right)^y} \quad (14)$$

Although numerical FEM data for $n_{Asym}(\theta)$ have been interpolated with a high degree of approximation with respect to the interpolation of $n_{Sym}(\theta)$, this expression intuitively shows that $n_{Asym}(\theta)$ has a reversed behaviour with respect to $n_{Sym}(\theta)$.

From FIG. 6 and FIG. 7 it is easy to notice that $n_{Sym}(\theta) \approx n_{Asym}(\theta) \approx n_g$ per θ<−10° e θ>10°. Waveguides cross sections at larger distances from the rotation axis (i.e., distances ranging from R−r−W/2 to R+r+W/2), show angular intervals of interaction for $n_{Sym}(\theta)$ and $n_{Asym}(\theta)$ narrower than those of FIG. 6 and FIG. 7, valid for R−r−W/2≈5 μm since the coupling range, in terms of linear distance, remains constant for every radius R.

Figure 2:
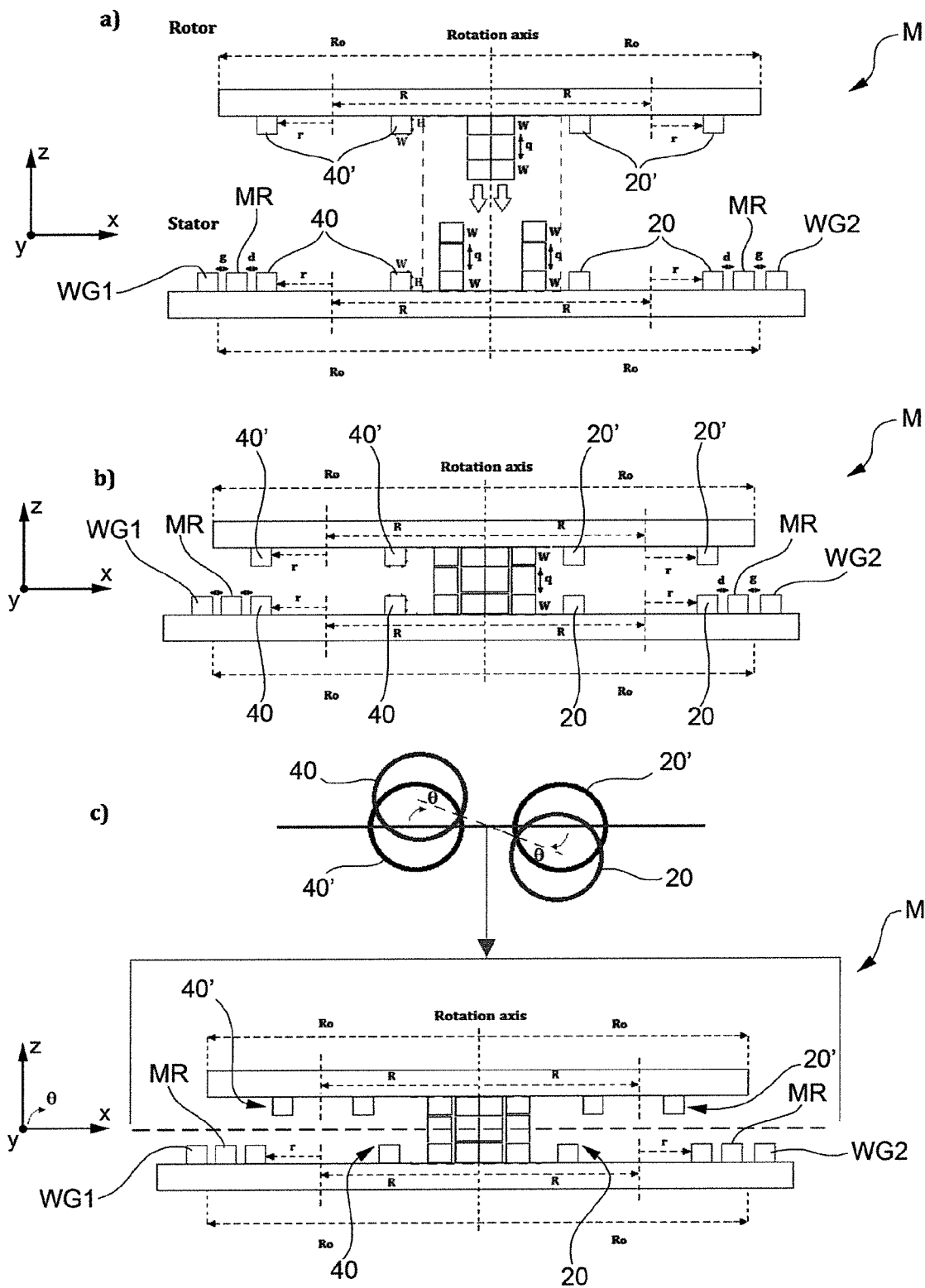
FIGS. 2*a*, 2*b* and 2*c* show a cross section of the stator plane and rotor plane of the photonic resonant motor of FIG. 1*b* in an exploded view, in a mounted view in a condition at rest and in operation at a small rotation ($\theta$) with respect to the condition at rest, respectively.

Once derived the rotatory mode-splitting dynamics of a single pair of VSRRs, we develop the optical model for N pairs of VSRRs in closed loop configuration, excited by two bus waveguides (i.e., WG1 and WG2 in FIGS. 1, 2).

Figure 8:
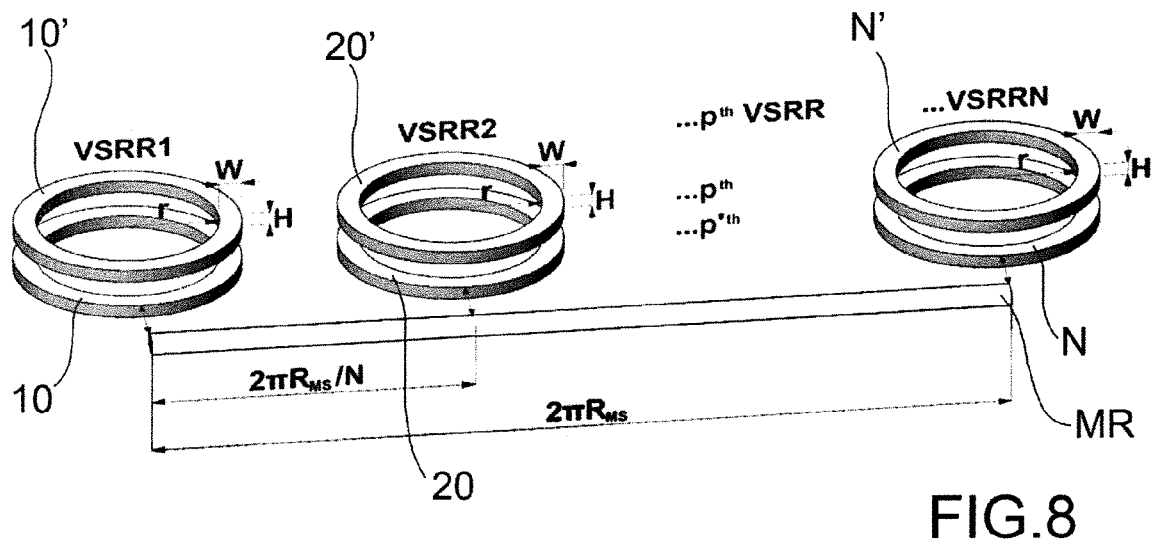
FIG. 8 is a schematic representation of an open loop configuration for N pairs of VSRRs laterally coupled to a stator master ring resonator.

At first, with reference to FIG. 8, where it is reported the open loop configuration of N pairs of parallel-coupled VSRRs, the phase term associated with the phase delay along the master ring is $\Phi_{MR}=4\pi^2 n_g R_{MR}/\lambda$, where the master ring radius $R_{MR}$ is equal to R+r+d+3W/2. The N pairs of VSRRs (i.e., N=4 in FIG. 1(a)), are displaced in order to be equally spaced (i.e., periodically displaced) so that the phase term associated to the optical path between the $p^{th}$ pair of VSRRs and the $(p+1)^{th}$ pair is $\Phi_{EX}=\Phi_{MR}/N$, with N the number of pairs of VSRRs.

According to D. G Rabus, Integrated Ring Resonator. The Compedium. New York: Springer-Verlag, 2007 the intracavity build-up amplitude of the electrical optical field due to the presence of the master ring, can be expressed as:

$$E_{Bu} = \frac{j\varsigma t(\lambda)^N e^{j\Phi_{EX}}}{1 - t(\lambda)^{2N}\sqrt{1-\varsigma^2}\, e^{j2\Phi_{EX}}} E_{IN} \quad (15)$$

where ς is optical field amplitude transferred from the bus waveguide WG1/WG2 to the master ring, that depends on the geometrical gap g between WG1/WG2 and the master ring (see FIG. 2a).

The power enhancement factor, $E_N$, in the master ring is:

$$E_N = \frac{|E_{EX}|^2}{|E_{IN}|^2} = \varsigma^2 \left| \frac{t(\lambda)^N}{1 - \psi t(\lambda)^{2N} e^{j2\Phi_{EX}}} \right|^2 \quad (16)$$

$E_N$ is a fundamental parameter because it takes into account the intra-cavity power enhancement with respect to the power $|E_{IN}|^2$ exciting the bus waveguides WG1/WG2. In a resonant optical system, being the strength of the opto-mechanical force linearly dependent on the input optical power, for values of ς allowing the optical cavity to be under-coupled (i.e., below the critical coupling condition), the intra-cavity power enhancement $E_N$ represents an improvement factor (e.g. with respect to a single a pair of VSSRs directly excited through a bus waveguide).

TABLE I

Photonic Resonant Motor: physical parameters, symbols and assumed values

| Physical parameters | Symbols | Assumed values |
|---|---|---|
| Silicon refractive index | $n_{Si}$ | 3.45 |
| Silicon dioxide refractive index | $n_{SiO2}$ | 1.46 |
| Air refractive index | $n_{air}$ | 1 |
| Waveguide width | W | 500 nm |
| Waveguide height | H | 300 nm |
| Couples of Vertically Stacked Ring Resonators (VSRRs) | N | 4 |
| Vertical inter-ring gap/Inter rings coupling coefficient per micron unit | q/k@1.55 μm* | 400 nm/0.0164* |
| Normalized field amplitude coupled from the master ring to the rings | h | 0.1 |
| Normalized field amplitude coupled from bus waveguides to the master ring | ς | 0.1 |
| Ring radius | r | 5 μm |
| Distance between rotation axis and rings center | R | 15 μm |
| Master ring radius | $R_{MR}$ | R + r + d + 3W/2 |
| Rotor radius | $R_0$ | >$R_{MR}$ |
| Input Power | $P_i$ | 100 mW |

Figure 9:
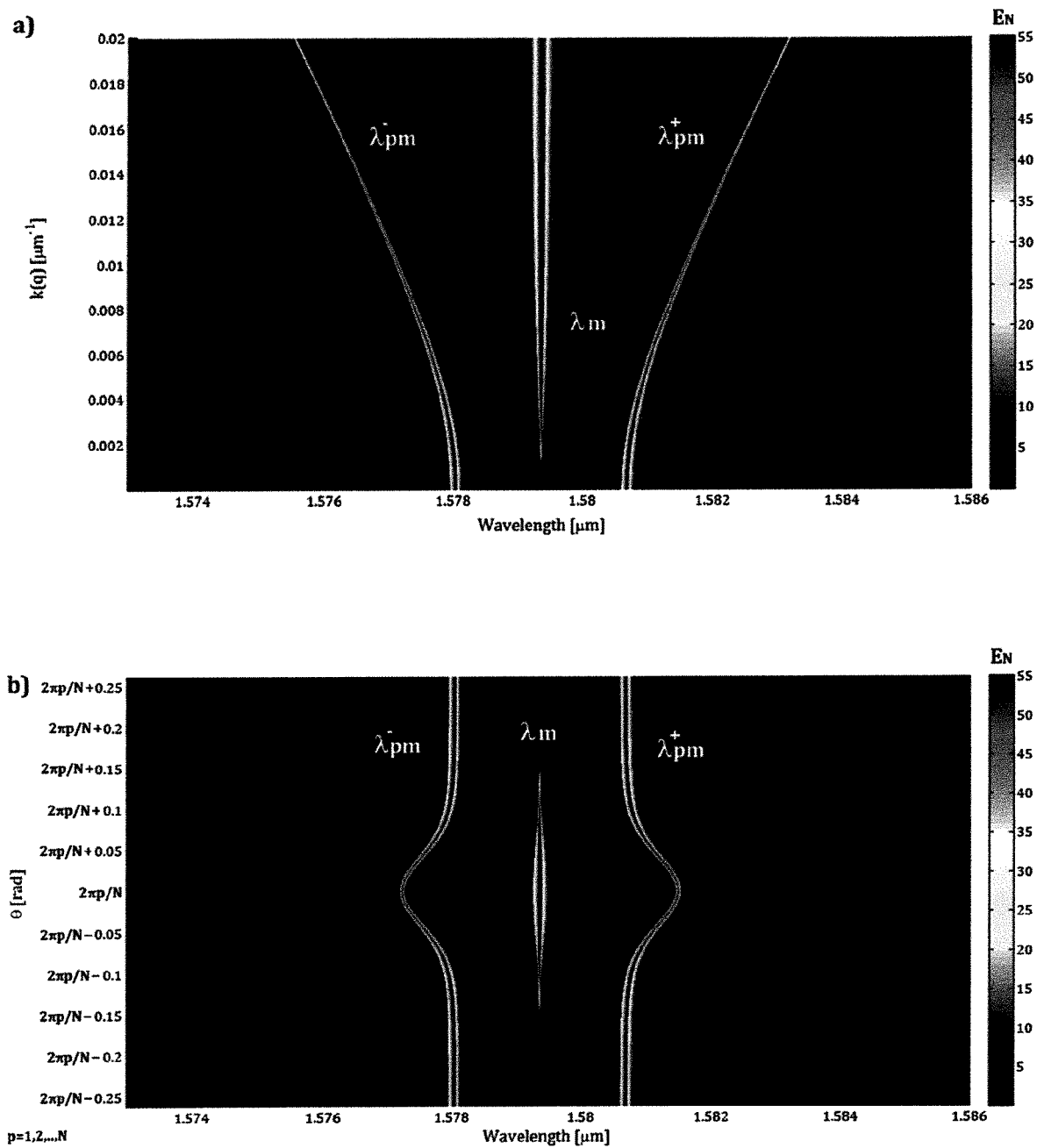
FIGS. 9*a* and 9*b* show the enhancement factor $E_N$ and mode splitting dynamics for a photonic resonant motor made by 4 pairs of VSRRs closed in loop into the master ring resonator, respectively: as a function of inter-ring distance and as a function of the inter-ring rotation angle.

With reference to the physical parameters reported in Table 1, in FIG. 9a it is represented the enhancement factor $E_N$ behavior of Eqn. (16) as function of the wavelength λ and k(q), in order to include also the mode splitting dynamics in the analysis. Due to the presence of 4 pairs of VSRRs closed in loop into the master ring, the mode splitting dynamics differs the one of a single pair of VSRRs. For values of k(q) ranging from 0.002 μm$^{-1}$ and 0.02 μm$^{-1}$, the photonic motor shows a splitting dynamics characterized by a central resonance line centered at $\lambda_m$ (in analogy with FIG. 5a) and the two asymmetric resonance lines, now called $\lambda_{pm}^+$ and $\lambda_{pm}^-$ (in analogy with $\lambda^+$ and $\alpha^-$ of FIG. 5a) that are not converging to the degenerate mode condition ($\lambda_m$ such as shown in FIG. 5a). For k(q)=0 (i.e., q→±∞) we proved that the resonance $\lambda_{pm}^+$ and $\lambda_{pm}^-$ assume values depending from all the physical parameters reported in Table 1. Analogously to the angular mode splitting dynamics for a single pair of VSRR reported in FIG. 5b, in FIG. 9b the interaction of the 4 pairs of VSRRs, with q=q*, closed into the master ring allows an angular interaction in the range [2πp/N−0.4, 2πp/N+0.4], by following a similar trend as explained in FIG. 5b. Indeed, the trend is similar but not the same of FIG. 5b because of the presence of the straight resonance line centred at $\lambda_m$ that avoid the convergence at $\lambda_m$ of the two asymmetric resonance lines $\lambda_{pm}^+$ and $\lambda_{pm}^-$. We proved that only for a single pair of VSRRs the trend is perfectly the same of FIG. 5b.

Now, reverting back to considering the geometrical construction reported in FIG. 4, where ξ is the distance between the two centres of the two rings of a single pair of VSRRs, q=q* is a fixed vertical distance between the two VSRRs, R is the distance between the rotation axis and the VSRRs centres, θ is the rotation angle of the rotor ring with respect to the corresponding stator ring, and the zero reference angle for rotations (θ=0) is assumed to be in the configuration of perfect stacking, the following description assumes validity for small rotation angles near θ=0 and θ increasing only in positive direction (dθ>0, i.e. always maintaining the same direction of rotation).

Figure 10:
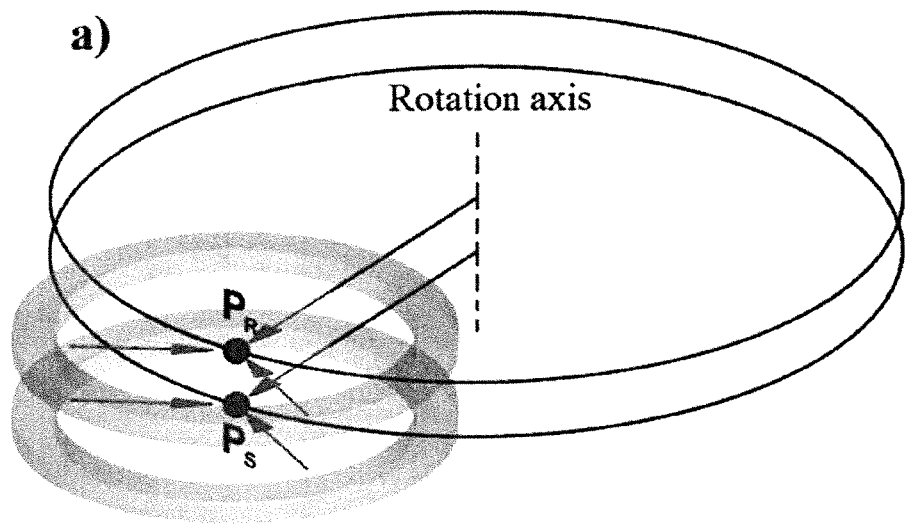
FIG. 10 is a geometrical description of the equivalent lumped parameters system of a single pair of VSRRs.
Figure 10:
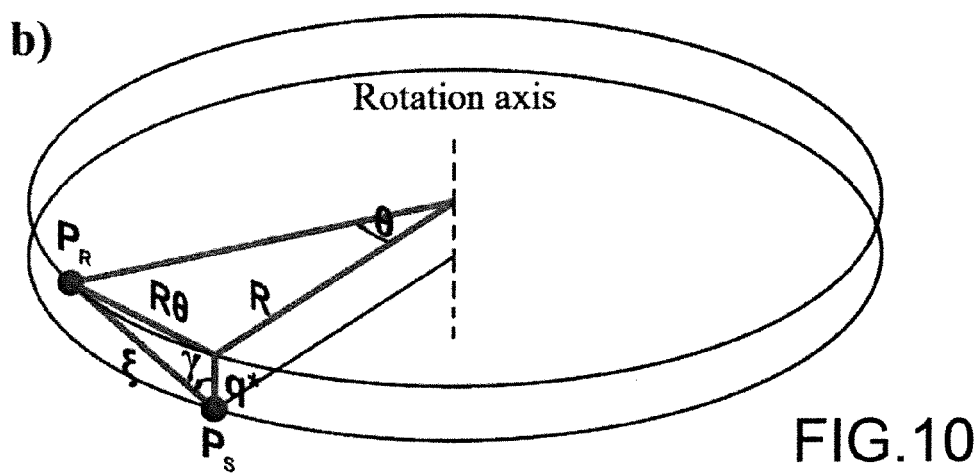

The physical parameters of the optical resonators, including geometrical features of the wave-guiding rings and their cross sections, converge into an equivalent concentrated point coinciding with the geometrical centre of each ring resonator (placed at a distance R from the rotation axis). With this assumption, the opto-mechanical theory focuses on a lumped model enabling the study of the mutual forces acting along the moving line connecting those points (i.e., see $P_S$ and $P_R$ the stator and rotor equivalent points in FIG. 10a).

The mechanical behaviour of the photonic resonant motor is ruled by opto-mechanical force $F_\xi$, due to the cavity-enhanced radiation pressure, acting between $P_S$ and $P_R$. $F_\xi$ can be derived by a quantum argument or classical argument, being that force generated between two weakly-coupled resonators, as disclosed by M. L. Povinelli, Steven G Johnson, Marko Lončar, Mihai Ibanescu, Elizabeth J. Smythe, Federico Capasso, and J. D. Joannopoulos, "High-Q enhancement of attractive and repulsive optical forces between coupled whispering-gallery-mode resonators," Opt. Express 13, 8286-8295 (2005). It is given by:

$$F_\xi = -\frac{1}{\omega_0^2}\frac{d(\Delta\omega)}{d\xi}PQ_m \xrightarrow{\omega=\frac{2\pi c}{\lambda} \to \delta\omega=-\frac{2\pi c}{\lambda^2}\delta\lambda \to \Delta\omega=-\frac{2\pi c}{\lambda^2}\Delta\lambda} F_\xi = \frac{1}{2\pi c}\frac{d(\Delta\lambda)}{d\xi}PQ_m \quad (17)$$

where P is the optical power circulating in a single pair of VSRRs, and P is given by:

$$P = P_i E_N \quad (18)$$

where $P_i$ is the input source (e.g., laser) power and $E_N$ is the power enhancement factor (Eqn. 16);

and where $Q_m$ is the quality factor of a standing alone ring resonator, referred to the m-th resonance order, that can be evaluated for angular conditions θ=(2p+1)π/N (non-coupling condition).

The resonant electromagnetic energy $U_r$ stored in a single stator ring is given by:

$$U_r = \frac{\lambda_m}{2\pi c}PQ_m \quad (19)$$

With the assumption of small rotation angles near the zero reference angle it can be considered the linearized distance Rθ (corresponding to the projection of the distance ξ on x-y plane, see FIG. 10b and FIG. 4a) instead of the chord length. Thus, ξ can be expressed as:

$$\xi = \sqrt{R^2\theta^2 + q^{*2}} \quad (20)$$

By considering Eqn. (20) and Eqn. (12), $\Delta\lambda(0)=\lambda_m^\pm(\theta)-\lambda_m$ so that $d(\Delta\lambda(0))=d(\lambda_2^\pm(0))\approx d(\lambda_{pm}^\pm(\theta))$, Eqn. 17 can be expressed as:

$$F_\xi \approx \frac{1}{2\pi c}\frac{d(\Delta\lambda(\theta))}{d(\xi(\theta))}PQ_m = \frac{1}{2\pi c}\frac{d(\Delta\lambda(\theta))}{d\theta}\frac{d\theta}{d(\xi(\theta))}PQ_m \approx \pm\frac{r\sqrt{R^2\theta^2+q^{*2}}}{2R^2\theta mc}\frac{d(n_{Sym}(\theta)-n_{Asym}(\theta))}{d\theta}PQ_m \quad (21)$$

We conventionally define as negative the attractive forces, associated to the symmetric resonance line, and as positive the repulsive forces, associated to the anti-symmetric resonance line. Thus, $F_\xi$ can be expressed as $F_{\xi\lambda}^+$ and $F_{\xi\lambda}^-$, for the symmetric and the anti-symmetric resonance line (see FIG. 9b), $\lambda_{pm}^+$ and $\lambda_{pm}^{31}$, respectively, as:

$$F_{\xi\lambda^+} = -\frac{r\sqrt{R^2\theta^2+q^{*2}}}{2R^2\theta mc}\frac{d(n_{Sym}(\theta)-n_{Asym}(\theta))}{d\theta}PQ_m \ [N] \quad (22)$$

$$F_{\xi\lambda^-} = +\frac{r\sqrt{R^2\theta^2+q^{*2}}}{2R^2\theta mc}\frac{d(n_{Sym}(\theta)-n_{Asym}(\theta))}{d\theta}PQ_m \ [N] \quad (23)$$

Due to the reduction to the lumped equivalent system, $F_{\xi\lambda}^-$ and $F_{\xi\lambda}^-$ act along ξ (i.e., the moving line connecting the centres of the coupled stator and rotor rings). With reference to the angle γ (see FIG. 10b), defined as:

$$\gamma = \text{arc}tg\left(\frac{R|\theta|}{q^*}\right) \quad (24)$$

two particular projections of the overall force $F_{\xi\lambda}^{+(-)}$ are considered: the axial component, $F_{z\lambda}^{+(-)}$ and the tangential component $F_{\theta\lambda}^{+(-)}$, given by:

$$F_{z\lambda}^{+(-)} = F_{\xi\lambda}^{+(-)}\cos(\gamma) [N] \quad (25)$$

$$F_{\theta\lambda}^{+(-)} = F_{\xi\lambda}^{+(-)}\sin(\gamma) [N] \quad (26)$$

$F_{z\lambda}^{+(-)}$ is balanced by the reaction forces given by the external frame, while $F_{\theta\lambda}^{+(-)}$ causes the motion of the rotor.

Figure 11:
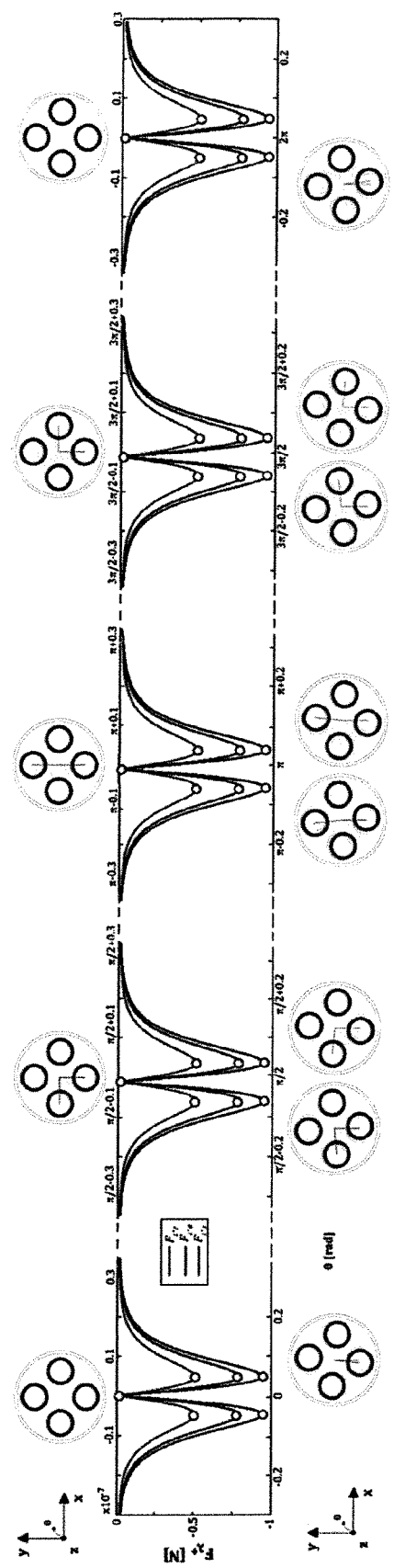
FIG. 11 shows the opto-mechanical force distribution for the symmetric resonance line $\lambda^+$ as a function of the rotation angle $\theta$ between the stator plane and the rotor plane.

With reference to the specific configuration of the photonic motor reported in FIGS. 1 and 2, where N=4, in FIG. 11 the curve representing the opto-mechanical force distribution for the symmetric resonance line λ⁻ (see eigenvalues grid in FIGS. 5b and 9b) is reported as a function of the rotation angle. The opto-mechanical force distribution for the anti-symmetric resonance line λ⁻ is inverted with respect to the symmetric one and it is not reported for simplicity.

The torque $C_1(0)$ exerted by a single pair of coupled rings and acting on the rotor is computed, by multiplying the value of the tangential force $F_{\theta\lambda}^{+(-)}$ by the distance R from the point $P_R$ to the rotation axis. As stated before, this assumption (implying perpendicular directions for $F_{\theta\lambda}^{|(-)}$ and R) is acceptable when considering small rotation angles near the zero reference angle:

$$C_1(\theta) = F_{\theta\lambda}^{+(-)} \cdot R [Nm] \quad (27)$$

In the presented configuration (N=4 CVSRRs, equally interspaced over 2 π rad), N in-phase functions may be summed in order to obtain the overall torque C(θ):

$$C(\theta) = N \cdot C_1(\theta) [Nm] \quad (28)$$

It is easy to notice that the overall torque linearly increases with increasing dynamic parameter $F_{\theta\lambda}^{+(-)}$ and topological/geometrical parameters N and R.

Figure 12:
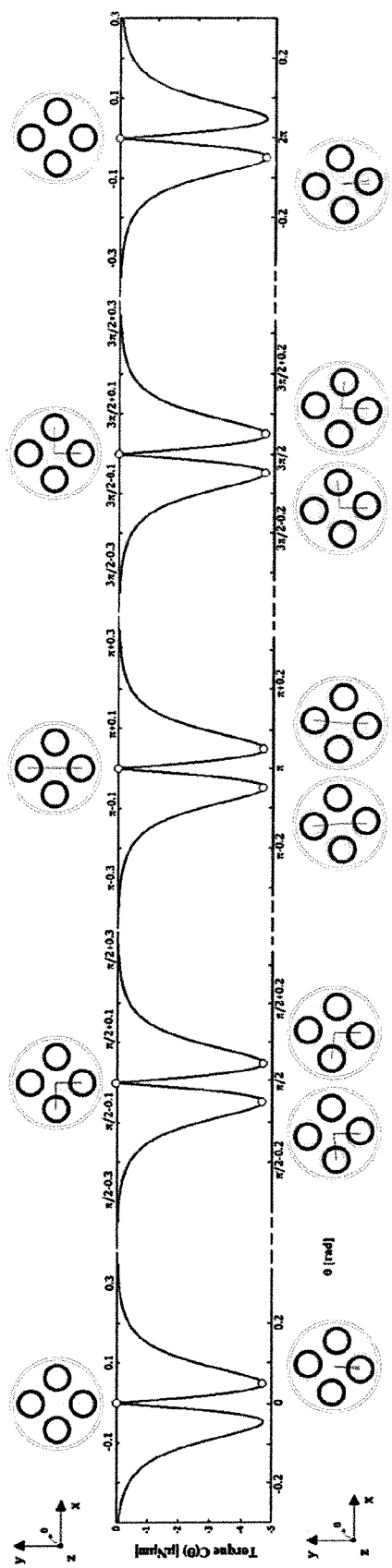
FIG. 12 shows the opto-mechanical torque distribution for the symmetric resonance line $\lambda^+$ as a function of the rotation angle $\theta$ between the stator plane and the rotor plane.

FIG. 12 discloses the opto-mechanical torque distribution for the symmetric resonance line λ⁺ as a function of the rotation angle θ.

One of the techniques trough control elements that can be used to sustain the rotation in such a system and extract useful torque from the rotor is a synchronous timing: when working with the symmetrical resonance line (attractive forces), it is required to keep the (laser) source active only during the approaching phase and to turn it off when the rotor rings are in perfect stacking condition with the corresponding stator rings. After this phase, thanks to inertia forces, the rotor will keep its motion until it reaches the next coupling condition with a different stator ring.

An alternative to this technique trough control elements consists in working with the anti-symmetrical resonance line (repulsive forces), turning on the (laser) source only when the rotor rings are in perfect stacking condition with the corresponding stator rings and maintaining it switched on during the entire escaping phase, until the optical coupling between the facing rings drops down.

Another method consists in using a combination of the previous, ensuring a switch from attraction (during approaching phase) to repulsion (during escaping phase).

A more complex, but efficient, technique that can be applied to obtain full motion control is represented by a step-by-step architecture: considering, as an example, the symmetrical resonance line (attractive forces) a single stator ring, when active, attracts the nearest rotor ring, until it gets trapped in the local zero position (stacking condition). In order to obtain a second movement (step), a driver unit turns off the previous stator ring and activates the next one. The aforementioned rotor ring leaves its actual position because it gets attracted by a different stator ring, and pulls the whole rotor until it reaches the new settling position. This mechanism repeats (even along both directions of rotation) according to the actions imposed by the driver unit. It is to be noted that the proposed embodiment of the present invention in the above description is exemplary and non-limiting to the present invention. A skilled person can easily implement the present invention in various embodiments that do not depart from the principles outlined herein. This applies in particular to the possibility of varying the arrangement of the first optical waveguides arrangement, the second optical waveguides arrangement and the excitation optical waveguide arrangement coupled to said first optical waveguides arrangement.

Figure 13:
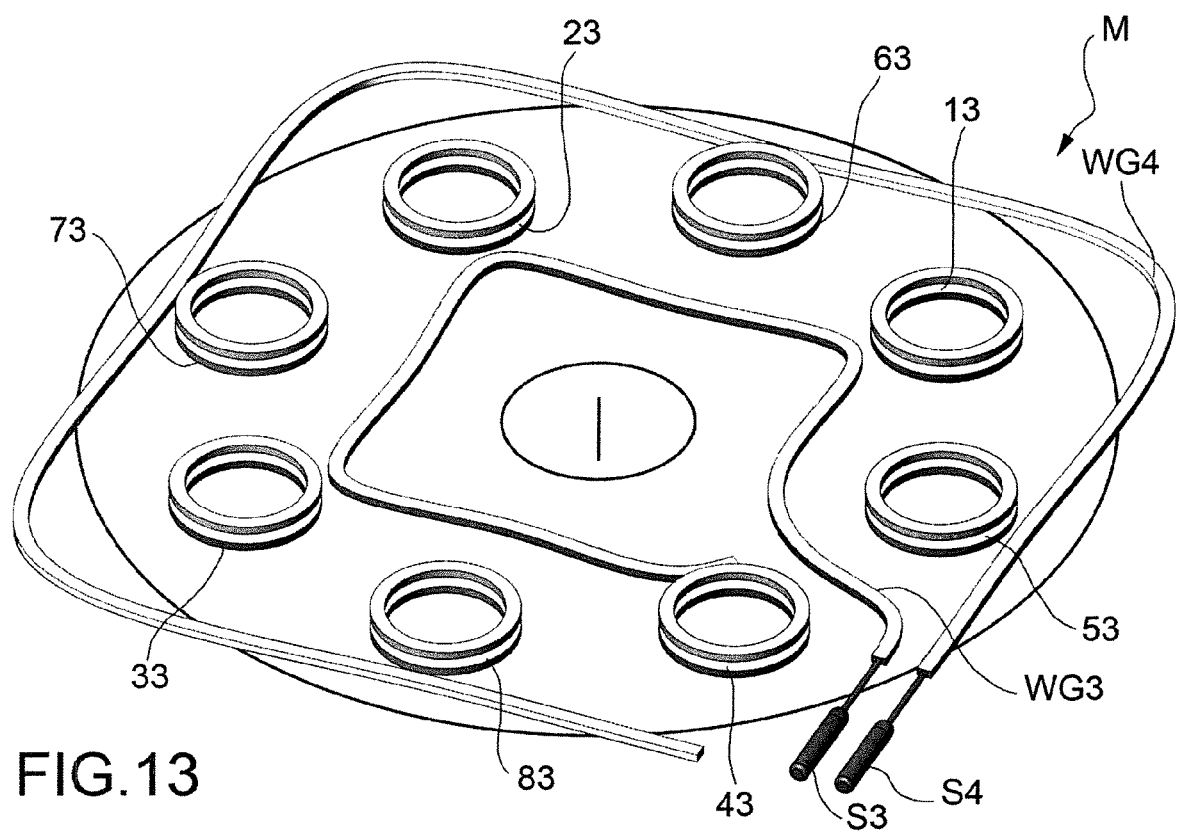
FIGS. 13-17 show schematic prospective views of further embodiments of the photonic resonant motor according to the invention.

FIG. 13 shows an alternative embodiment of a photonic resonant motor M according to the invention, wherein the first optical waveguides arrangement comprises at least two subsets of optical ring resonators interleaved along a common circular path on the stator plane (an exemplary array of eight optical ring resonators, four for each subset, is depicted in the Figure). A first subset of optical ring resonators 13, 23, 33, 43 is excited through a first waveguide WG3 inscribed in the circular path and having an optimized shape such that it reaches a predetermined optical mode coupling distance to each optical resonator 13, 23, 33, 43 of the first subset, the first waveguide WG3 being configured to receive at least one optical radiation of predetermined wavelength from a first optical radiation input S3. A second subset of optical ring resonators 53, 63, 73, 83 is excited through a second waveguide WG4 circumscribed to the circular path and having an optimized shape such that it reaches a predetermined optical mode coupling distance to each optical resonator 53, 63, 73, 83 of the second subset in some specific designed points, the second waveguide WG4 being configured to receive at least one optical radiation of predetermined wavelength from a second optical radiation input S4.

Figure 14:
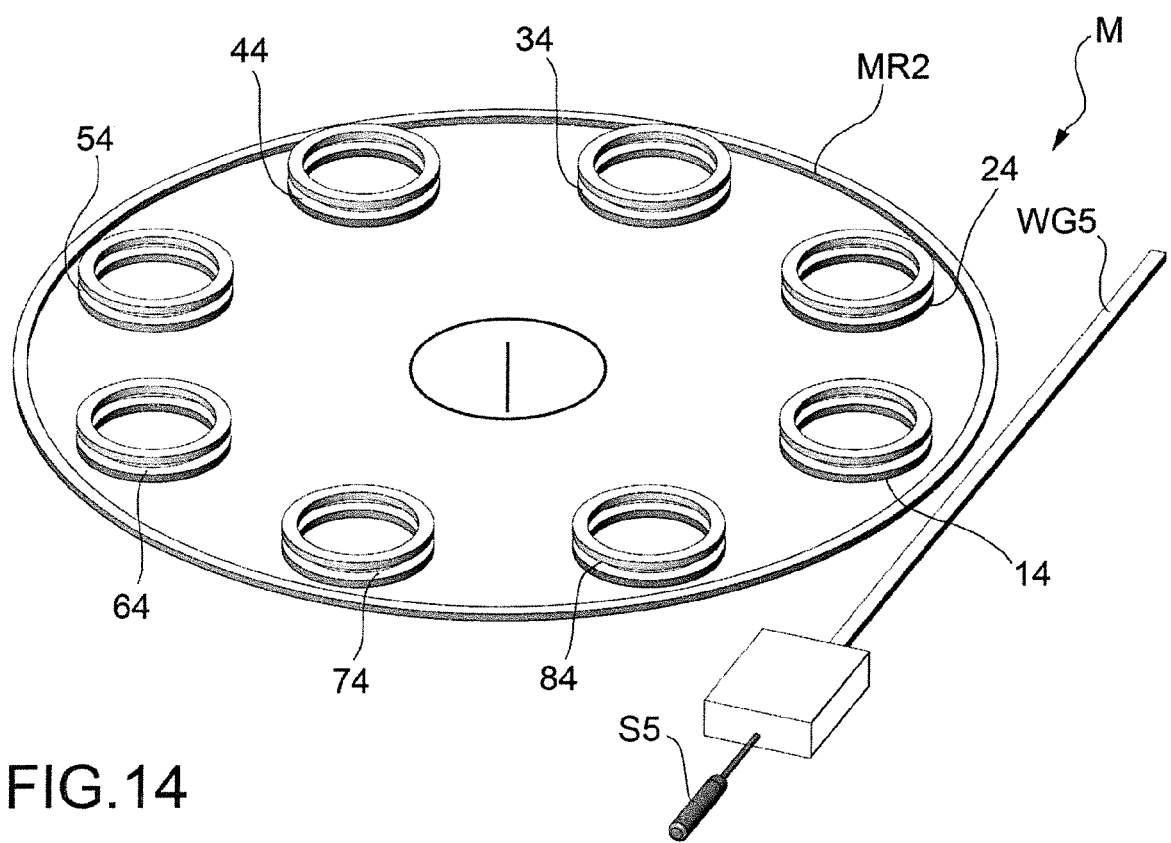

FIG. 14 shows an alternative embodiment of a photonic resonant motor M according to the invention, wherein the first optical waveguides arrangement comprises a subset of optical ring resonators 14-84 arranged along a common circular path on the stator plane (an exemplary circular array of eight optical ring resonators is depicted in the Figure). A master ring resonator MR2 is circumscribed to the circular path and has a general circular shape so that it reaches a predetermined optical mode coupling distance to each optical resonator at regularly spaced angular positions. The master ring resonator MR2 is excited through a rectilinear waveguide WG5 configured to receive at least one optical radiation of predetermined wavelength from an optical radiation input S5 and tangentially passing in the proximity of the master ring resonator MR2.

Figure 15:
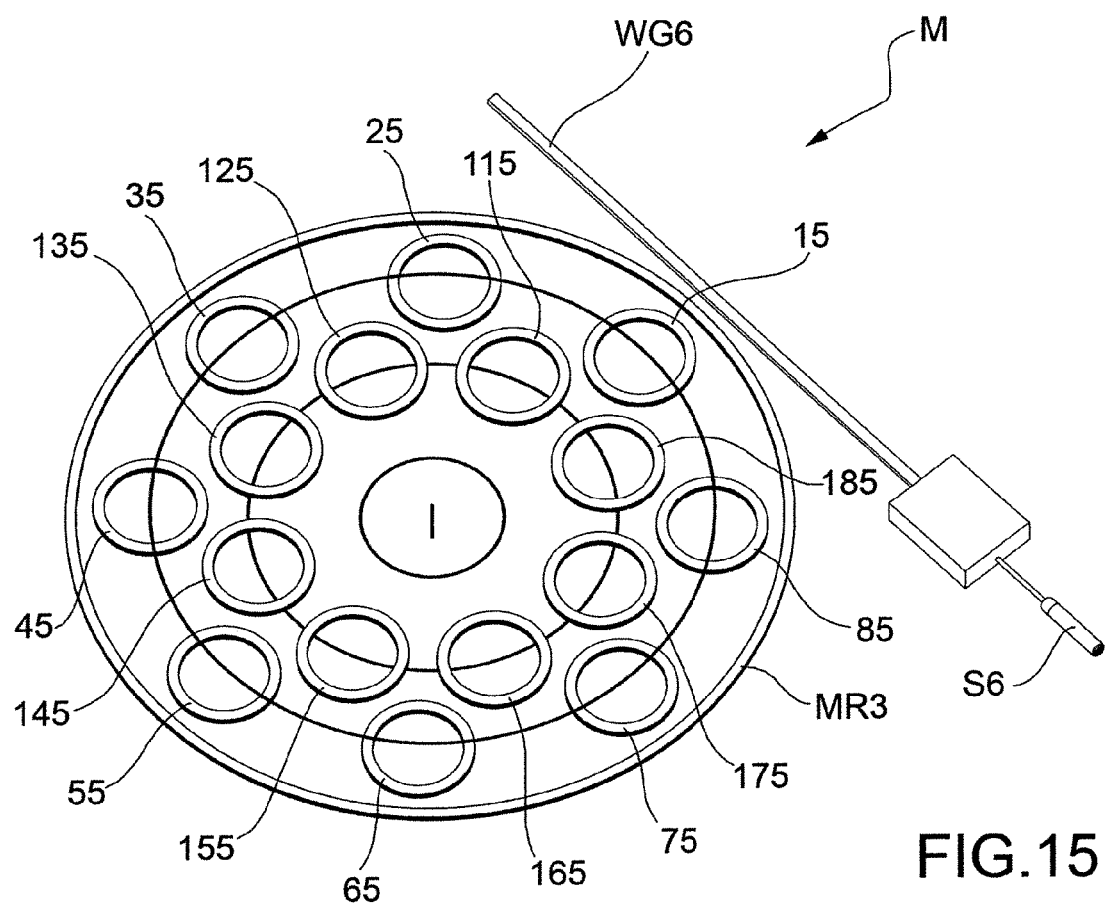

FIG. 15 shows an alternative embodiment of a photonic resonant motor M according to the invention, wherein the first optical waveguides arrangement comprises two subsets of optical ring resonators 15-85, 115-185 arranged along coaxial circular paths on the stator plane (two exemplary circular arrays of eight optical ring resonators each are depicted in the Figure). A master ring resonator MR3 is circumscribed to the circular paths of the two subsets of optical ring resonators and has a general circular shape so that it reaches a predetermined optical mode coupling distance to each optical resonator 15-85 of the outermost subset of coaxially arranged optical ring resonators, at regularly spaced angular positions. The master ring resonator MR3 is excited through a rectilinear waveguide WG6 configured to receive at least one optical radiation of predetermined wavelength from an optical radiation input S6 and tangentially passing in the proximity of the master ring resonator MR3.

Figure 16:
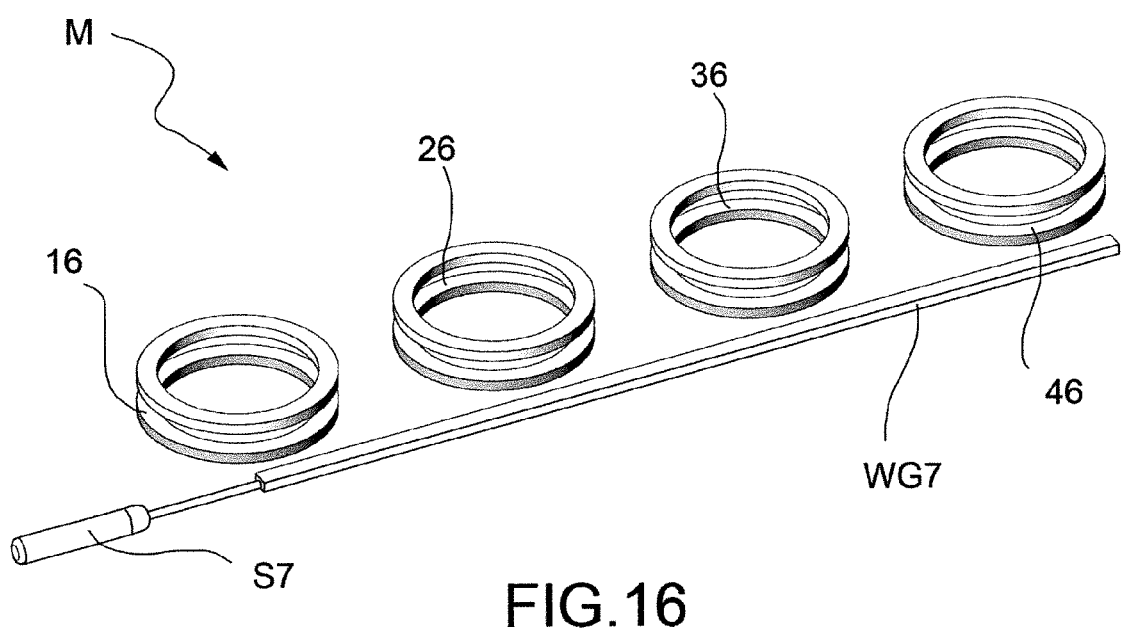

FIG. 16 shows an alternative embodiment of a photonic resonant motor M according to the invention, wherein the first optical waveguides arrangement comprises an array of optical ring resonators 16, 26, 36, 46 arranged along a linear path on the stator plane (an exemplary array of four optical ring resonators is depicted in the Figure). The optical ring resonators are excited through a rectilinear waveguide WG7 extending sideways to the linear path of optical ring resonators so that it reaches a predetermined optical mode coupling distance to each optical resonator at regular distances, the waveguide WG7 being configured to receive at least one optical radiation of predetermined wavelength from an optical radiation input S7.

Figure 17:
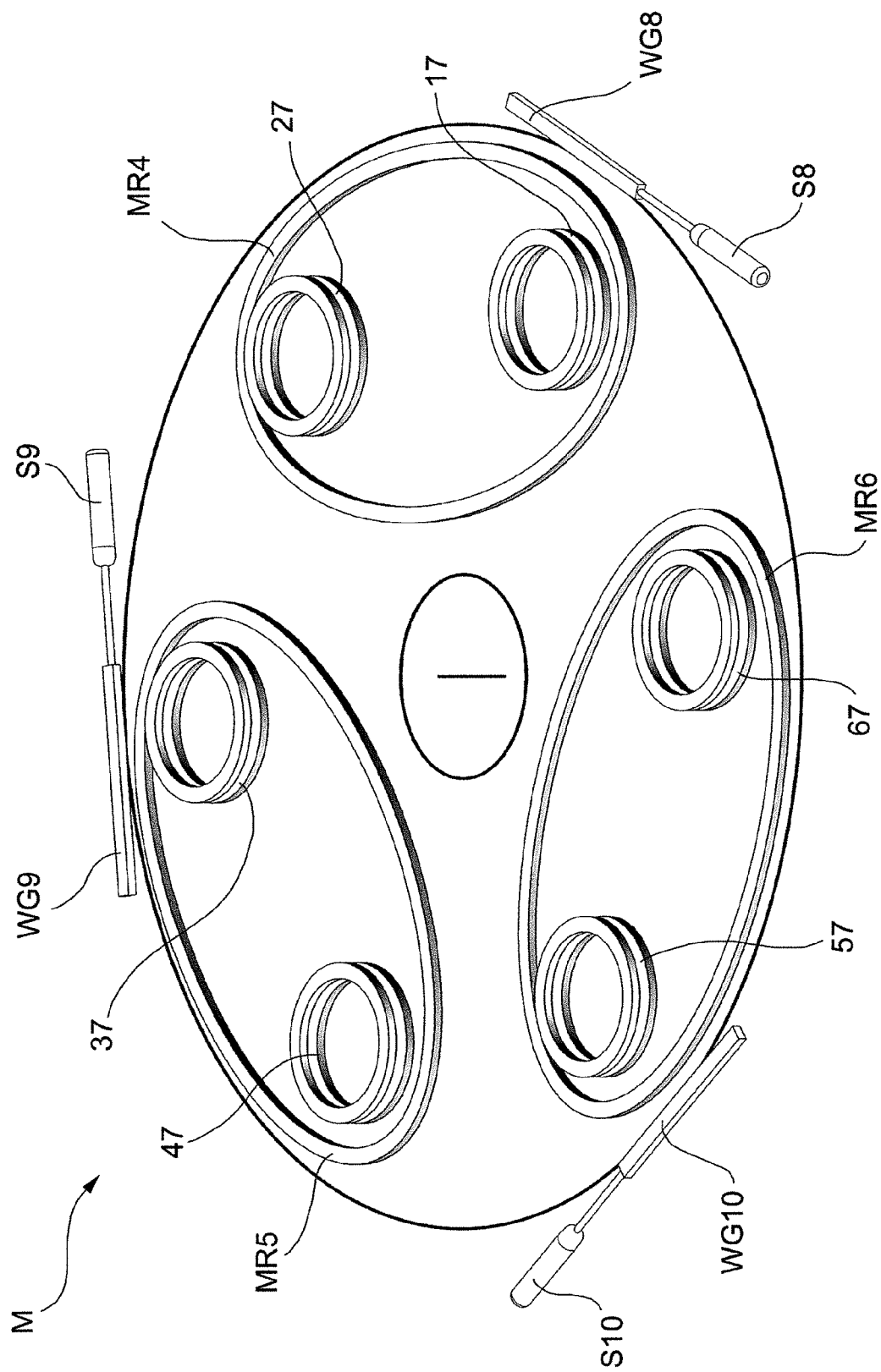

FIG. 17 shows a further alternative embodiment of a photonic resonant motor M according to the invention, wherein the first optical waveguides arrangement comprises three subsets of optical ring resonators arranged along a circular path on the stator plane, each subset of optical ring resonators having a pair of optical ring resonators 17-27, 37-47, 57-67. A respective master ring resonator MR4, MR5, MR6 is circumscribed to each subset of optical ring resonators and has a general elliptical shape so that it reaches a predetermined optical mode coupling distance to each optical resonator of the subset, at regularly spaced angular positions. Each master ring resonator MR4, MR5, MR6 is excited through a respective rectilinear waveguide WG8, WG9, WG10 configured to receive a respective optical radiation of predetermined wavelength from a respective optical radiation input S8, S9, S10 and tangentially passing in the proximity of the master ring resonator.

The principle of the invention remaining unchanged, embodiments may be modified with respect to those described by way of non-limitative examples, and those skilled in the art will understand that the optical and optomechanical modelling of a photonic resonant motor described above with reference to the arrangement of FIGS. 1a and 1b and illustrated by referring to FIGS. 2 to 12 will also apply to the photonic resonant motor arrangements disclosed in FIGS. 13 to 17 with the appropriate adaptations, without departing from the scope of protection as described and claimed herein.

The invention claimed is:

1. A photonic motor comprising:
   at least one optical radiation input;
   a first optical waveguides arrangement, including at least one first optical resonator lying in a first plane to form a static part of said motor in a predetermined coordinate reference system of the motor;
   an excitation optical waveguides arrangement coupled to said first optical waveguides arrangement at a predetermined optical mode coupling distance to said at least one first optical resonator and configured to receive at least one optical radiation of predetermined wavelength from said at least one optical radiation input and to optically couple said optical radiation to said at least one first optical resonator;
   at least a second optical waveguides arrangement, including at least one second optical resonator lying in a second plane parallel to said first plane at a predetermined stacking distance perpendicular to said planes, the second optical waveguides arrangement being configured to move in said second plane with respect to said first optical waveguides arrangement according to at least a predefined direction of movement, so as to form a moving part of said motor in the predetermined coordinate reference system of the motor,
   wherein said predetermined stacking distance is adapted to establish an evanescent-wave coupling of optical modes between at least one first optical resonator of said first optical waveguides arrangement and at least one second optical resonator of said second optical waveguides arrangement, in a proximity condition of said first and second optical resonator in a plane transversal to said first and second plane where local motion of said second arrangement occurs,
   said first and second optical resonator being adapted to guide at least one resonant symmetric mode at a predetermined first wavelength or at least one resonant anti-symmetric mode at a predetermined second wavelength or at least a combination or superposition of at least one resonant symmetric mode at a predetermined first wavelength and at least one resonant anti-symmetric mode at a predetermined second wavelength, as a function of said stacking distance as well as of the distance between said first and second optical resonator on the transversal plane, and
   wherein, when a resonant symmetric mode is selectively established, an attractive condition of said second optical resonator towards said first optical resonator is established that generates, on said second plane, a motion of approach of the second optical resonator towards the first optical resonator according to said predefined local direction of movement, or, when a resonant anti-symmetric mode is selectively established, a repulsive condition of said second optical resonator from said first optical resonator is established, that generates on said second plane a motion of departure of the second optical resonator from the first optical resonator according to said predefined local direction of movement.

2. The photonic motor of claim 1, further comprising control elements arranged to control at least a parameter of the radiation from said at least one optical radiation input so as to selectively establish at least one of said resonant symmetric and anti-symmetric mode.

3. The photonic motor of claim 1, wherein said first optical waveguides arrangement includes a plurality of first optical resonators and said control elements are arranged to
   synchronously control the wavelength of the radiation from said optical radiation input so as to selectively switch from a resonant symmetric mode to a resonant anti-symmetric mode when said at least one second optical resonator along said predefined direction of movement in the second plane is near the stacking condition with respect to a coupled first optical resonator along said predefined direction of movement in the first plane, or
   synchronously control, once fixed a resonant symmetric mode, the activation of the optical radiation input only during the approaching phase and turning it off when said at least one second optical resonator along said predefined direction of movement in the second plane, is near the stacking condition with respect to a coupled first optical resonator along said predefined direction of movement in the first plane, and thanks to inertia forces, reaches the next coupling condition with a different first optical resonator along said predefined direction of movement in the first plane, or
   synchronously control, once fixed a resonant anti-symmetric mode, the activation of the optical radiation input only during the escaping phase and turning it on when said at least one second optical resonator along said predefined direction of movement in the second plane is near the stacking condition with respect to a coupled first optical resonator along said predefined direction of movement in the first plane and turning it off when said at least one second optical resonator along said predefined direction of movement in the second plane, goes out from the coupling condition with said first optical resonator, and thanks to inertia forces, reaches the next coupling condition with a different first optical resonator along said predefined direction of movement in the first plane.

4. The photonic motor of claim 1, wherein the parameter of the radiation from said optical radiation input is at least one of: the wavelength, the phase, the polarization of said radiation, the turn on/off timing of said radiation, the power of said radiation.

5. The photonic motor of claim 1, wherein said first optical waveguides arrangement includes a plurality of first optical resonators arranged along at least one predetermined path in the first plane, and said second optical waveguides arrangement includes a plurality of second optical resonators arranged along at least one predetermined path in the second plane.

6. The photonic motor of claim 5, wherein said control elements are arranged to automatically control at least a parameter of the radiation from said at least one optical radiation input so as to selectively establish a resonant symmetric mode when the position of said at least one second optical resonator along said at least one predetermined path in the second plane lags behind the position of a coupled first optical resonator along said at least one predetermined path in the first plane according to said predefined direction of movement, and a resonant antisymmetric mode when the position of said at least one second optical resonator along said at least one predetermined path in the second plane is ahead of the position of said coupled first optical resonator along said at least one predetermined path in the first plane according to said predefined direction of movement.

7. The photonic motor of claim 5, wherein said at least one predetermined path in the first plane and said at least one predetermined path in the second plane are closed paths.

8. The photonic motor of claim 7, wherein said closed paths are circular paths.

9. The photonic motor of claim 7, wherein a closed path of second optical resonators in said second optical waveguides arrangement is coaxial to a closed path of first optical resonators in said first optical waveguides arrangement.

10. The photonic motor of claim 5, wherein said at least one predetermined path in the first plane and said at least one predetermined path in the second plane are rectilinear paths.

11. The photonic motor according to of claim 5, wherein said optical resonators are evenly allocated along said predetermined paths.

12. The photonic motor of claim 1, wherein said first and second optical resonators are ring resonators, preferably circular ring resonators.

13. The photonic motor of claim 12, wherein said first optical resonators comprise a subset of selectively excited ring resonators and at least one excitation master ring resonator.

14. The photonic motor of claim 13, wherein said subset of first ring resonators and said second ring resonators have the same diameter.

15. The photonic motor of claim 1, wherein said first and second optical resonators are whispering-gallery mode optical resonators.

16. The photonic motor of claim 1, wherein said predetermined stacking distance between the first plane and the second plane is based on at least one of said predetermined first wavelength of the optical radiation from said optical radiation input, of the materials of said optical resonators, of geometrical features of said optical resonators.

17. The photonic motor of claim 1, wherein said excitation optical waveguide arrangement comprises at least one excitation optical waveguide coplanar with said first optical waveguides arrangement.

18. The photonic motor of claim 17, wherein said first optical waveguides arrangement includes a plurality of first optical resonators arranged along at least one predetermined circular path in the first plane and said at least one excitation optical waveguide extends along a path at least partially sideways to said at least one circular path.

19. The photonic motor of claim 17, wherein said first optical waveguides arrangement includes a plurality of first optical resonators arranged along a predetermined rectilinear path in the first plane and said at least one excitation optical waveguide extends along a path sideways to said rectilinear path.

20. The photonic motor of claim 1, wherein said excitation optical waveguide arrangement comprise at least one excitation optical waveguide in a plane different from said first plane of the first optical waveguides arrangement.

21. The photonic motor according to any one of the preceding claim 1, wherein said optical radiation input is at least one coherent radiation source or is coupled to at least one coherent radiation source.

22. The photonic motor of claim 21, wherein said coherent radiation source is a laser source whose operating bandwidth is dependent upon at least the size and materials of said first and second optical resonator and the dielectric between said first and second optical waveguides arrangement.

23. The photonic motor of claim 1, wherein at least a probe optical waveguide is coupled to said excitation optical waveguide arrangement.

24. The photonic motor of claim 1, wherein each of said first and second optical resonators and said excitation optical waveguide arrangement are made as optical fibres, integrated optical guides on a dielectric substrate, semiconductor active or passive structures, plasmonic structures, polymeric structures.

25. The photonic motor of claim 1, wherein the first optical waveguides arrangement is formed on a static part substrate arranged to be mechanically coupled to a first fixed machine structure at rest and the second optical waveguides arrangement is formed on a moving part substrate arranged to be mechanically coupled to a second machine structure movable with respect to said first fixed machine structure.

26. A photonic motor assembly, including a plurality of elementary units each comprising
 a photonic motor comprising:
  at least one optical radiation input;
  a first optical waveguides arrangement, including at least one first optical resonator lying in a first plane to form a static part of said motor in a predetermined coordinate reference system of the motor;
  an excitation optical waveguides arrangement coupled to said first optical waveguides arrangement at a predetermined optical mode coupling distance to said at least one first optical resonator and configured to receive at least one optical radiation of predetermined wavelength from said at least one optical radiation input and to optically couple said optical radiation to said at least one first optical resonator,
  at least a second optical waveguides arrangement, including at least one second optical resonator lying in a second plane parallel to said first plane at a predetermined stacking distance perpendicular to said planes, the second optical waveguides arrangement being configured to move in said second plane with respect to said first optical waveguides arrangement according to at least a predefined direction of movement, so as to form a moving part of said motor in the predetermined coordinate reference system of the motor, wherein said predetermined stacking distance is adapted to establish an evanescent-wave coupling of optical modes between at least one first optical resonator of said first optical waveguides arrangement and at least one second optical resonator of said second optical waveguides arrangement, in a proximity condition of said first and second optical resonator in a plane transversal to said first and second plane where local motion of said second arrangement occurs, said first and second optical resonator being adapted to guide at least one resonant symmetric mode at a predetermined first wavelength or at least one resonant anti-symmetric mode at a predetermined second wavelength or at least a combination or superposition of at least one resonant symmetric mode at a predetermined first wavelength and at least one resonant anti-symmetric mode at a predetermined second wavelength, as a function of said stacking distance as well as of the distance between said first and second optical resonator on the transversal plane, and wherein, when a resonant symmetric mode is selectively established, an attractive condition of said second optical resonator towards said first optical resonator is established that generates, on said second plane, a motion of approach of the second optical resonator towards the first optical resonator according to said predefined local direction of movement, or, when a resonant anti-symmetric mode is selectively established, a repulsive condition of said second optical resonator from said first optical resonator is established, that generates on said second plane a motion of departure of the second optical resonator from the first optical resonator according to said predefined local direction of movement, wherein said elementary units are mechanically coupled on a plane.

27. A photonic motor assembly, including a plurality of elementary units each comprising a photonic motor comprising:

at least one optical radiation input;

a first optical waveguides arrangement, including at least one first optical resonator lying in a first plane to form a static part of said motor in a predetermined coordinate reference system of the motor;

an excitation optical waveguides arrangement coupled to said first optical waveguides arrangement at a predetermined optical mode coupling distance to said at least one first optical resonator and configured to receive at least one optical radiation of predetermined wavelength from said at least one optical radiation input and to optically couple said optical radiation to said at least one first optical resonator;

at least a second optical waveguides arrangement, including at least one second optical resonator lying in a second plane parallel to said first plane at a predetermined stacking distance perpendicular to said planes, the second optical waveguides arrangement being configured to move in said second plane with respect to said first optical waveguides arrangement according to at least a predefined direction of movement, so as to form a moving part of said motor in the predetermined coordinate reference system of the motor, wherein said predetermined stacking distance is adapted to establish an evanescent-wave coupling of optical modes between at least one first optical resonator of said first optical waveguides arrangement and at least one second optical resonator of said second optical waveguides arrangement, in a proximity condition of said first and second optical resonator in a plane transversal to said first and second plane where local motion of said second arrangement occurs, said first and second optical resonator being adapted to guide at least one resonant symmetric mode at a predetermined first wavelength or at least one resonant anti-symmetric mode at a predetermined second wavelength or at least a combination or superposition of at least one resonant symmetric mode at a predetermined first wavelength and at least one resonant anti-symmetric mode at a predetermined second wavelength, as a function of said stacking distance as well as of the distance between said first and second optical resonator on the transversal plane, and wherein, when a resonant symmetric mode is selectively established, an attractive condition of said second optical resonator towards said first optical resonator is established that generates, on said second plane, a motion of approach of the second optical resonator towards the first optical resonator according to said predefined local direction of movement, or, when a resonant anti-symmetric mode is selectively established, a repulsive condition of said second optical resonator from said first optical resonator is established, that generates on said second plane a motion of departure of the second optical resonator from the first optical resonator according to said predefined local direction of movement, wherein said elementary units are mechanically coupled in a three-dimensional volume.

* * * * *